(12) United States Patent
Hamamoto

(10) Patent No.: US 12,489,733 B2
(45) Date of Patent: Dec. 2, 2025

(54) MANAGEMENT SYSTEM, MANAGEMENT METHOD, AND SERVER DEVICE

(71) Applicant: SHARP KABUSHIKI KAISHA, Sakai (JP)

(72) Inventor: Masanori Hamamoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 60 days.

(21) Appl. No.: 18/512,712

(22) Filed: Nov. 17, 2023

(65) Prior Publication Data

US 2024/0179127 A1 May 30, 2024

(30) Foreign Application Priority Data

Nov. 29, 2022 (JP) ................................ 2022-190653

(51) Int. Cl.
*H04L 9/40* (2022.01)
*H04L 41/22* (2022.01)

(52) U.S. Cl.
CPC .......... *H04L 63/0263* (2013.01); *H04L 41/22* (2013.01); *H04L 63/20* (2013.01)

(58) Field of Classification Search
CPC ...... H04L 63/0263; H04L 41/22; H04L 63/20
USPC ....................................................... 709/225
See application file for complete search history.

(56) References Cited

U.S. PATENT DOCUMENTS

| | | | | |
|---|---|---|---|---|
| 2013/0258384 | A1* | 10/2013 | Kanoh | G06F 3/1212 358/1.13 |
| 2015/0103376 | A1* | 4/2015 | Saeda | G06F 3/1292 358/1.15 |
| 2018/0084133 | A1 | 3/2018 | Kawai | |
| 2024/0096331 | A1* | 3/2024 | Lim | G10L 15/22 |
| 2024/0137739 | A1* | 4/2024 | Jeong | H04W 12/06 |

FOREIGN PATENT DOCUMENTS

| | | |
|---|---|---|
| JP | 2014-174936 A | 9/2014 |
| JP | 2018-049417 A | 3/2018 |

OTHER PUBLICATIONS

M. Ko, T. Inagi, M. Takada and T. Yano, "Application of Feature Selection Method to Error Factor Extraction of Multifunction Peripheral," 2019 IEEE International Conference on Industrial Engineering and Engineering Management (IEEM), Macao, China, 2019, pp. 1043-1047 (Year: 2019).*

(Continued)

*Primary Examiner* — Taylor A Elfervig
(74) *Attorney, Agent, or Firm* — ScienBiziP, P.C.

(57) ABSTRACT

A management system including a server device connected to a first network, a plurality of devices connected to a second network, and a terminal device connected to the first network or the second network, in which an agent is executed in a first device, which is any one of the plurality of devices, the agent acquires device information related to a second device connected to the second network and transmits the device information to the server device, the server device generates display information on the basis of the received device information and transmits the display information to the terminal device, and the terminal device displays a user interface related to the second device on the basis of the received display information.

14 Claims, 22 Drawing Sheets

(56) References Cited

OTHER PUBLICATIONS

Hosek, J., Masek, P., Kovac, D. et al. IP home gateway as universal multi-purpose enabler for smart home services. Elektrotech. Inftech. 131, 123-128 (2014). (Year: 2014).*

M. Mutemwa and F. Mouton, "Cyber security threats and mitigation techniques for multifunctional devices," 2018 Conference on Information Communications Technology and Society (ICTAS), Durban, South Africa, 2018, pp. 1-6, (Year: 2018).*

* cited by examiner

FIG. 3

| ID | MODEL NAME | SERIES NAME | SERIAL NUMBER | DEVICE NAME | OPTION INFORMATION | SETTING INFORMATION | | STATE INFORMATION | |
|---|---|---|---|---|---|---|---|---|---|
| | | | | | | SETTING ITEM NAME | SETTING VALUE | STATE ITEM NAME | STATE VALUE |
| 1 | A-Printer AA-6170 | A-Printer AA Series | 123456A00 | AA OFFICE MACHINE 6170 | FINISHER TRAY | HTTP PORT | VALID | CONNECTION STATE | Online |
| | | | | | | HTTP PORT NUMBER | 80 | TONER STATE | — |
| | | | | | | ... | ... | ... | ... |
| 2 | A-Printer BB-70 | A-Printer BB Series | 1122334400 | — | PAPER FOLDING UNIT | HTTP PORT | VALID | CONNECTION STATE | Offline |
| | | | | | | HTTP PORT NUMBER | 80 | TONER STATE | Toner Low |
| | | | | | | ... | ... | ... | ... |
| 3 | A-Printer AA-B707F | A-Printer AA Series | 123456A01 | — | — | HTTP PORT | INVALID | CONNECTION STATE | Online |
| | | | | | | HTTP PORT NUMBER | — | TONER STATE | — |
| | | | | | | ... | ... | ... | ... |
| ... | ... | ... | ... | ... | ... | ... | ... | ... | ... |

FIG. 4

| MODEL NAME | SERIES NAME | BASE-PAGE STORAGE LOCATION |
|---|---|---|
| A-Printer AA-6170 | A-Printer AA Series | /templates/AA/AA-6170/ |
| (Any) | A-Printer BB Series | /templates/BB/ |
| (Any) | A-Printer CC Series | /templates/CC/ |

FIG. 7

| ID | COMMUNICATION INFORMATION |
|---|---|
| 1 | 10. 36. 102. 45 |
| 2 | 10. 36. 102. 55 |
| 3 | 10. 36. 102. 190 |
| ⋮ | ⋮ |

FIG. 9

| SETTING ITEM NAME | SETTING VALUE |
|---|---|
| HTTP PORT | VALID |
| HTTP PORT NUMBER | 80 |
| ⋮ | ⋮ |

MANAGEMENT SYSTEM, MANAGEMENT METHOD, AND SERVER DEVICE

INCORPORATION BY REFERENCE

This application claims the benefit of priority under U.S.C. 119 based on Japanese Patent Application No. 2022-190653 filed on Nov. 29, 2022, the entire contents of which are incorporated herein by reference.

BACKGROUND OF THE INVENTION

Field of the Invention

This disclosure relates to a management system and the like.

Description of the Background Art

An art for remotely managing and monitoring a device such as a multifunction peripheral is known. For example, such an art is proposed that a device to be managed transmits state information of the device acquired and stored in advance to a remote maintenance server. Moreover, such an art of communicating with a multifunction peripheral installed in a customer site protected by a firewall is proposed.

An object of this disclosure to provide, for example, an art which causes a device connected to a first network to appropriately display a user interface related to a device connected to a second network.

SUMMARY OF THE INVENTION

A management system of this disclosure is a management system, including a server device connected to a first network, a plurality of devices connected to a second network, and a terminal device connected to the first network or the second network, characterized in that an agent is executed in a first device, which is any one of the plurality of devices, the agent acquires device information related to a second device connected to the second network and transmits the device information to the server device, the server device generates display information on the basis of the received device information and transmits the display information to the terminal device, and the terminal device displays a user interface related to the second device on the basis of the received display information.

A management method of this disclosure is a management method of a system including a server device connected to a first network, a plurality of devices connected to a second network, and a terminal device connected to the first network or the second network, characterized in that a first device connected to the second network acquires device information related to another second device in the network, the first device transmits the device information to the server device, the server device generates display information on the basis of the received device information and transmits the display information for displaying a user interface related to the second device to the terminal device on the basis of the device information.

A server device of this disclosure including a server device connected to a first network, a plurality of devices connected to a second network, and a terminal device connected to the first network or the second network, the server device being included in a management system in which an agent is executed in a first device, which is any one of the plurality of devices, characterized by having a communicator and a controller, in which the controller receives device information related to a second device connected to the second network from the agent via the communicator and transmits display information which causes a user interface related to the second device to be displayed on the terminal device on the basis of the device information received via the communicator.

According to this disclosure, an art which causes a device connected to a first network to appropriately display a user interface related to a device connected to a second network, for example, can be provided.

BRIEF DESCRIPTION OF THE DRAWINGS

FIG. 3 is a diagram illustrating an example of a data structure of target-device information in the First Embodiment.

FIG. 4 is a diagram illustrating an example of the data structure of base-page correspondence information in the First Embodiment.

FIG. 7 is a diagram illustrating an example of a data structure of target-device communication information in the First Embodiment.

FIG. 9 is a diagram illustrating an example of a data structure of setting table in the First Embodiment.

DESCRIPTION OF THE PREFERRED EMBODIMENTS

Figure 1:
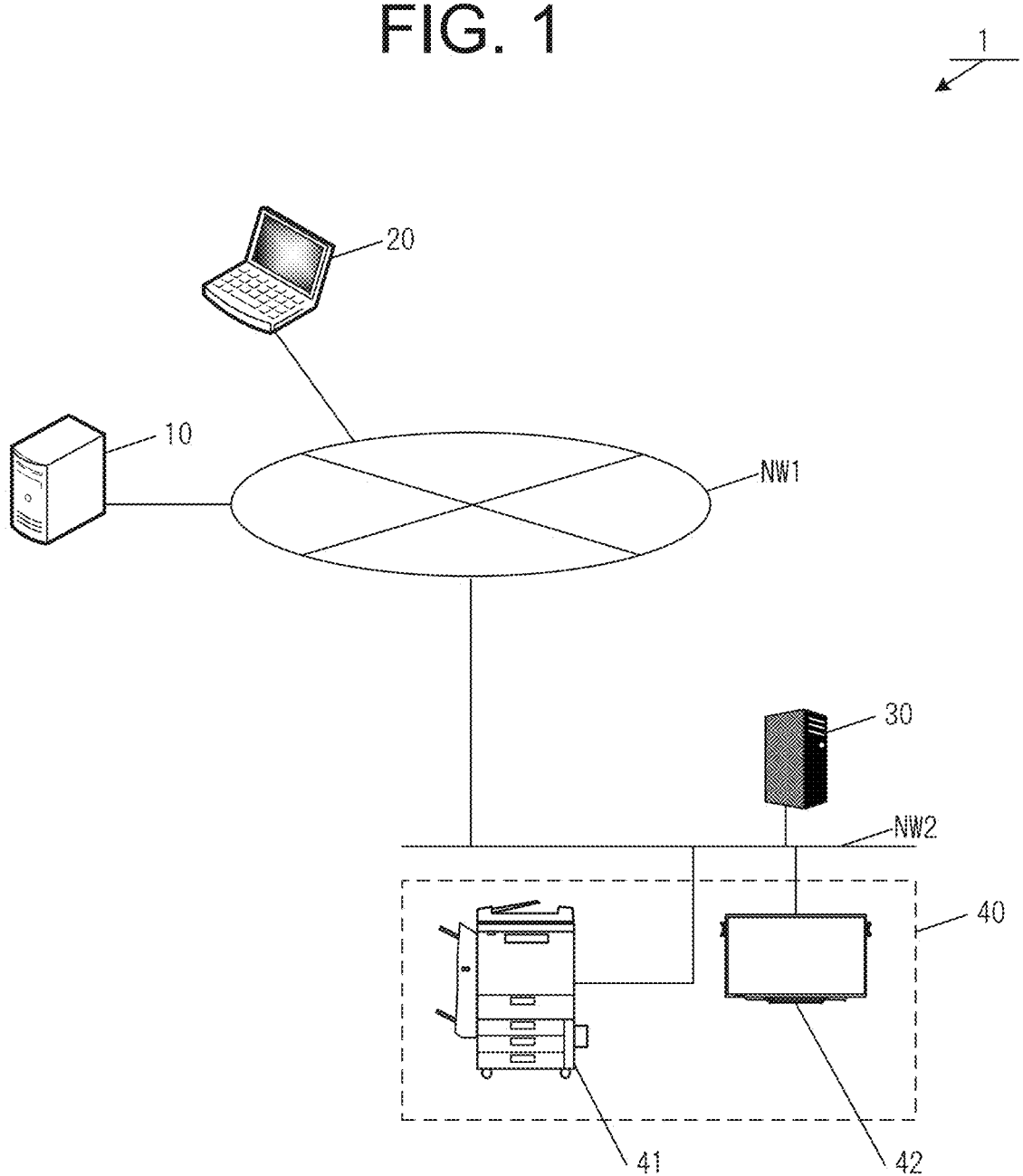
FIG. 1 is an entire configuration diagram of a system in a First Embodiment.

An Embodiment for implementing this disclosure will be explained hereinafter with reference to the accompanying drawings. It is to be noted that the following Embodiment is an example for explaining this disclosure, and a technical range of the disclosure described in the scope of claims is not limited to the following description.

In recent years, some of devices such as a multifunction peripheral have a function of displaying a user interface (a Web page, for example) for displaying information of the device and for changing settings. A Web page provided by the device to display information or to change settings of the device is referred to as a device Web page in some cases. In general, a user connects a terminal device such as a Personal Computer (PC) to the same network as a network to which a device that provides the device Web page is connected so that the terminal device can communicate with the device. Then, the user causes the terminal device and the device to communicate with each other via the network and causes the device Web page of the device to be displayed on the terminal device, whereby browsing of information or setting change of the device is performed. It is to be noted that the device Web page may also be configured by a plurality of Web pages. In this case, the user browses information of the device or changes the setting of the device while switching Web pages constituting the device Web page.

On the other hand, when a device such as a multifunction peripheral is installed in a company or the like, an internal network separated from an external network may be constructed, and the device may be connected to the internal network. The internal network is separated from the external network by a network device such as a firewall or a router. In this case, the device Web page of the device connected to the internal network is usually not viewable from the external network.

In order to browse a device Web page of a device connected to the internal network from the external network, a user changes the setting of a firewall or uses software called an agent (Agent), for example. For example, in the conventional art, it is known that a server constructed on a cloud performs centralized management on the basis of an instruction via a Web browser or the like of a user terminal outside the firewall, information of a device is acquired and various settings are performed via an agent in the firewall and via a Web browser of a multifunction peripheral. Moreover, in the conventional art, it is known that a Web browser of a user PC communicates with a Web browser in a device via the agent.

However, in the conventional art, each time a transition or the like in a Web page is performed, transaction with a device via an agent in a firewall occurs from a cloud server outside the firewall. As a result, performance of display operations such as display of Web pages of the device deteriorates.

Moreover, when the user directly operates the device Web page of the device connected to the internal network by using the terminal device connected to the external network, a possibility of occurrence of a new security problem increases.

Figure 22:
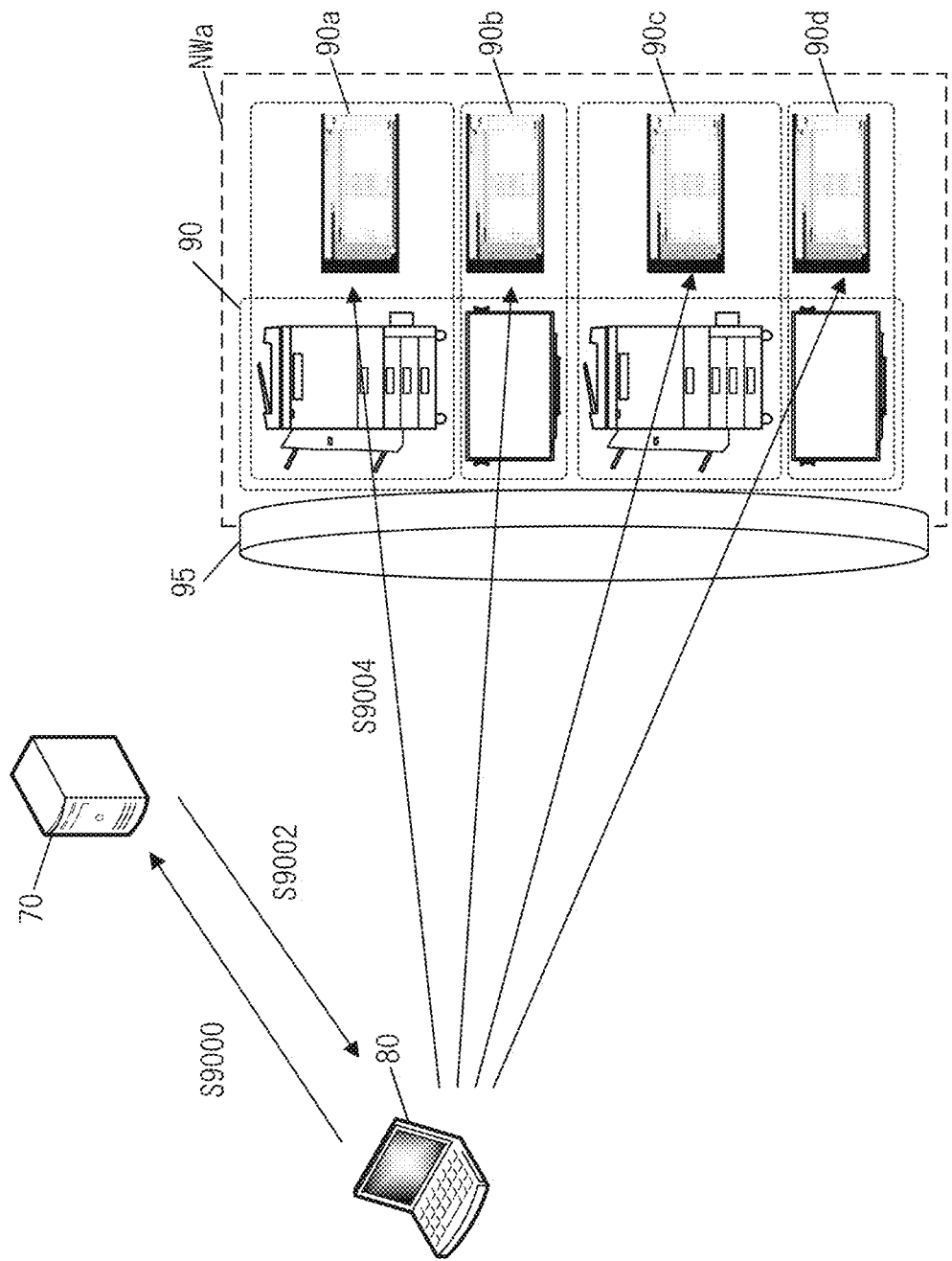
FIG. 22 is a diagram illustrating an example of a security problem.

With reference to FIG. 22, a specific example related to a security problem will be explained. FIG. 22 is a diagram illustrating a case where there are a plurality of devices 90 connected to an internal network NWa (in-house network). The internal network NWa is separated from the external network by a firewall 95. When a user (an IT administrator, a person in charge of a monitoring service, or the like) browses a device Web page of the device 90, the user causes an access request for the device Web page to be transmitted from a terminal device 80 used by the user to a server device 70 on the cloud on which device management software operates (S9000). Subsequently, the server device 70 provides information for accessing the device Web page to the terminal device 80 (S9002). Subsequently, the terminal device 80 connects to the internal network NWa directly from the Internet or the like on the basis of the information for accessing the device Web page, and accesses the device 90 (S9004). As a result, the user can cause the device Web page of the multifunction peripheral (90a and 90c in FIG. 22) or the device Web page of the display (90b and 90d in FIG. 22) to be displayed on the terminal device 80.

Here, in order for the terminal device 80 to be connected to a device in the internal network NWa via the Internet, setting of permission of network access needs to be made in a device such as the firewall 95. For example, in order to enable communication from the Internet side, a port needs to be opened in accordance with the number of the devices 90 to which the terminal device 80 is to be connected. As the number of the ports to be opened increases in accordance with the number of devices, security risks such as unauthorized access via the ports increase.

Thus, in the following Embodiments, an example of a method of virtually and appropriately displaying a device Web page of a device connected to an internal network separated from an external network will be explained.

1. First Embodiment

1.1 Overall Configuration

FIG. 1 is a diagram for explaining an outline of a system 1. The system 1 includes a network NW1 (a first network) and a network NW2 (a second network) separated from the network NW1. The network NW1 is an external network (WAN, Wide Area Network) such as the Internet. The network NW2 is an internal network constructed by a local area network (LAN) or the like. The network NW2 is an in-house network of a customer, for example. For example, the network NW1 and the network NW2 are connected via a gateway device. The gateway device is, for example, a network device such as a firewall or a router.

A server device 10 and a terminal device 20 are connected to the network NW1. Moreover, a plurality of devices are connected to the network NW2. For example, a processing device 30 (first device) and a target device 40 (second device) are connected to the network NW2.

The server device 10 is an information processing device installed on a cloud, for example. The server device 10 will be described as a single device for convenience of explanation but may also be configured by a plurality of devices. For example, data stored in the server device 10 may also be stored in a storage area of another device on the cloud, and processing executed by the server device 10 may also be executed by a plurality of devices in a distributed manner. Moreover, the server device 10 may also be constructed on a virtual PC.

Moreover, the server device 10 manages one or a plurality of devices. For example, software (device management software) for realizing Remote monitoring and management (RMM) is installed in the server device 10.

The terminal device 20 is a device used by a user, which is an information processing device configured by, for example, a mobile terminal such as a smartphone and a tablet or a PC or the like. The terminal devices 20 may also be connected in plural to the network NW1.

The processing device 30 is an information processing device in which software called an agent is installed and a function of the agent is executed. For example, the processing device 30 is configured by a PC in which agent software for RMM is installed. The agent realizes transmission and reception of information between a device connected to an external network such as the server device 10 and a device connected to an internal network such as the target device 40. For example, the agent acquires information of the target device 40 and transmits the information to the server device 10 or transmits information received from the server device 10 to the target device 40.

The target device 40 is a device managed by the server device 10. The target device 40 is a multifunction peripheral 41, a display device 42 or the like, for example. The multifunction peripheral 41 is also called a Multi-Function Printer/Peripheral (MFP) and is an image processing device having a copy function, a scan function, a print function, a fax function and the like. Moreover, the display device 42 is a device that displays predetermined information and is a digital signage, for example. It is to be noted that the target devices 40 may also be connected in plural to the network NW2.

1.2 Functional Configuration

1.2.1 Server Device

Figure 2:
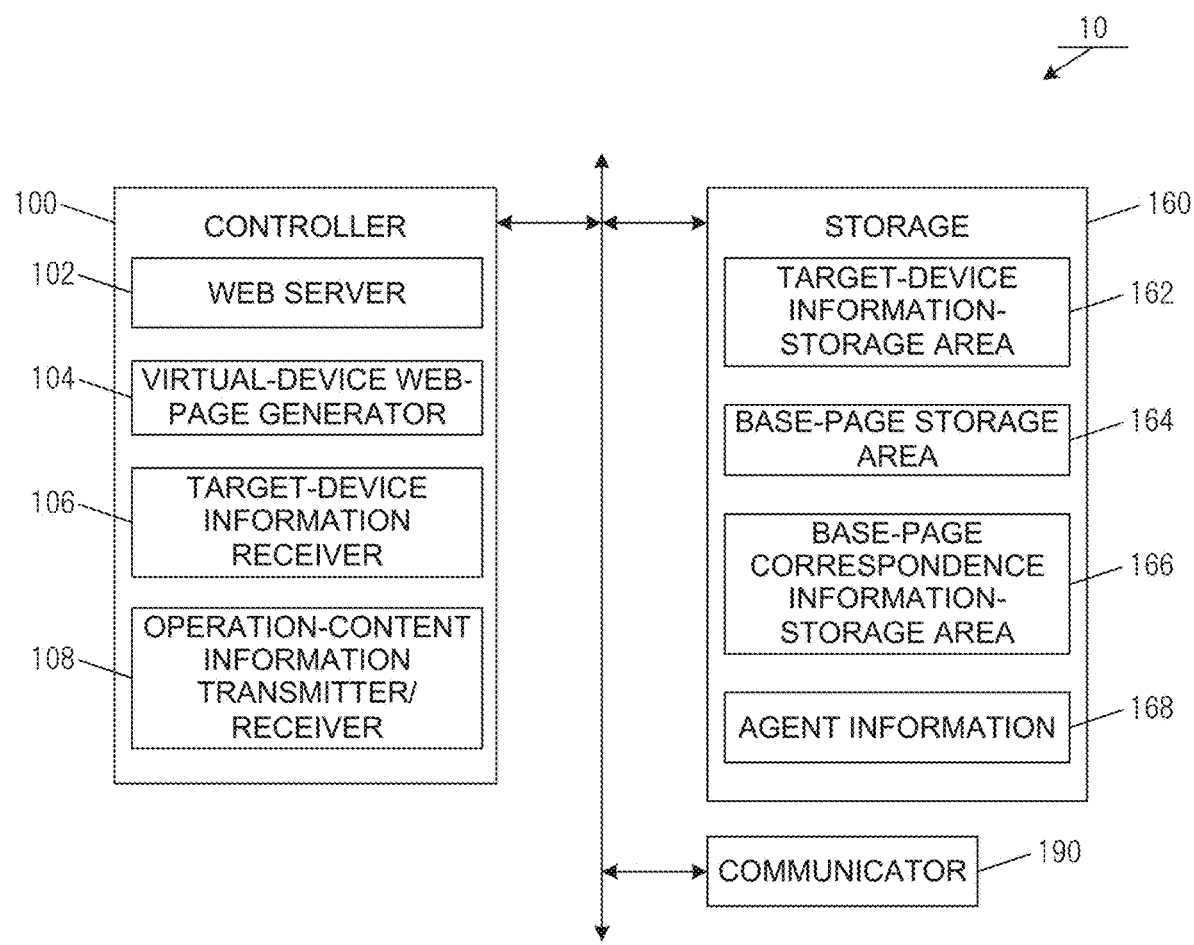
FIG. 2 is a diagram illustrating a functional configuration of a server device in the First Embodiment.

FIG. 2 is a diagram illustrating a functional configuration of the server device 10. The server device 10 includes, for example, a controller 100, a storage 160, and a communicator 190, and is configured by connecting each of the functions.

A controller 100 is a function for controlling the entire server device 10. The controller 100 realizes various functions by reading and executing various programs stored in a storage 160. The controller 100 may be configured by, for example, one or a plurality of arithmetic devices (Central Processing Unit (CPU)) or the like, or may also be configured as a System on a Chip (SoC) having a plurality of functions among functions described below.

The controller 100 functions as a Web server 102, a virtual-device Web-page generator 104, a target-device information receiver 106, and an operation-content information transmitter/receiver 108 by executing a program stored in the storage 160.

The Web server 102 realizes a function as a Web server. The virtual-device Web-page generator 104 generates a virtual-device Web page which is a Web page reproducing a device Web page displayed on the target device 40. It is to be noted that device Web page is a Web page provided by the device in order to display information or to change settings of the device as already explained. The target-device information receiver 106 receives information (target-device information) of the target device 40 from the processing device 30 via the communicator 190. The operation-content information transmitter/receiver 108 receives operation-content information from the terminal device 20 and transmits the operation-content information to the processing device 30 via the communicator 190. The operation-content information is information indicating the content of an operation input to the virtual-device Web page by the user. The operation-content information includes, for example, information of a setting value set by the user, information indicating an operation performed by the user (an operation of acquiring information, a power-source operation, input switching or the like), and information for identifying the target device 40 in which the content of the operation is to be reflected (for example, an ID of the target device 40 or the like).

The storage 160 stores various programs and various types of data necessary for the operation of the server device 10. The storage 160 may be configured by storage devices such as a Read Only Memory (ROM), a Random Access Memory (RAM), a Solid State Drive (SSD), a Hard Disk Drive (HDD) and the like, which are semiconductor memories, for example.

The storage 160 ensures a target-device information-storage area 162, a base-page storage area 164, and a base-page correspondence information-storage area 166 as storage areas and stores agent information 168.

The target-device information-storage area 162 stores target-device information. The target-device information includes, for example, as shown in FIG. 3, an ID ("1", for example) for identifying the target device 40, a model name ("A-Printer AA-6170", for example) of the target device 40, a series name ("A-Printer AA Series", for example) of the target device 40, a serial number ("123456A00", for example) of the target device 40, a device name ("AA office machine 6170", for example) of the target device 40, option information ("finisher tray", for example) regarding options provided in the target device, setting information of the target device, and state information of the device.

The serial number is a number assigned in advance to each target device 40. As the serial number, a unique number is assigned to each target device 40, and one unit of the target device 40 can be specified by the serial number.

As the option information, for example, information indicating an optional device provided in the target device 40 is stored. In a case where the target device 40 is the multifunction peripheral 41, the optional device can be provided as a finisher tray, a paper weaving unit or the like. Information such as "finisher tray" or "paper folding unit" is stored in the option information in accordance with the optional device provided in the target device 40.

The setting information is information related to items that can be set in the target device 40. The setting information is, for example, a table in which a setting item name ("HTTP port", for example) and a setting value ("valid", for example) for the setting item are associated with each other for each setting item. The setting information may also be contents of a setting table 464 described later.

The state information is information indicating a state of the target device 40. The state information is, for example, a table in which a state item name ("connection state", for example) and a state value ("Online", for example) indicating the content of the state corresponding to the state item are associated with each other for each state item (type of the state).

It is to be noted that the target-device information may include information other than the above-described information. For example, the target-device information may include information such as information unique to the target device 40 (a Media Access Control (MAC) address), a current state of the target device 40 (a version of firmware, for example), and management information (a registration date of the target device 40, for example).

The base-page storage area 164 stores data of a base page, which is a Web page serving as a base (model, template) of the device Web page of the target device 40.

The base page is a Web page that imitates a design (layout, color arrangement, character type, character size, and the like) of the device Web page of the target device 40 and is a Web page in which texts and images included in the device Web page are arranged in advance. For example, the base page is configured by data described in HyperText Markup Language (HTML), an image, Cascading Style Sheets (CSS) and the like. Moreover, the base page is configured such that the information of the target device 40 can be embedded at a spot where information unique to the target device 40 (setting information or state information, for example) is displayed. For example, in the base page, a spot where the information unique to the target device 40 is embedded is configured as a blank area. That is, by causing the information of the target device 40 to be reflected (embedded) in the base page, a virtual-device Web page that reproduces the device Web page of the target device 40 can be generated. It is to be noted that, when the device Web page is configured by a plurality of Web pages, the base page may also be also configured by a plurality of Web pages. In addition, a link in the device Web page may also be reproduced in the base page.

The base page may also be stored for each model name or series name. It is to be noted that the model name is a name given in common to the same model having the same function and capability, and the series name is a name given to a plurality of models having similar functions and capabilities. Moreover, the information that can be included may also be different depending on the optional configuration of the target device 40.

The base-page correspondence information-storage area 166 stores information (base-page correspondence information) in which a model name or a series name of the target device 40 is associated with a corresponding base page. As shown in FIG. 4, the base-page correspondence information includes a model name ("A-Printer AA-6170", for example) of the target device 40, a series name ("A-Printer AA Series", for example) of the target device 40, and a storage location ("/templates/AA/AA-6170/", for example) of the corresponding base page. It is to be noted that, as shown in FIG. 4, the model name of the base page is arbitrary, and one base page may also be associated with the target device 40 having a specific series name. Moreover, the base page may also be associated with information other than the model name or the series name.

The agent information 168 stores information used for communication with the processing device 30 functioning as an agent. For example, the agent information 168 includes information (an Internet Protocol (IP) address of the processing device 30 or a port number used for communication, for example) required to communicate with the processing device 30.

The communicator 190 communicates with other devices such as the terminal device 20 via a network such as a LAN or a WAN. The communicator 190 may be configured by a communication device or a communication module such as a Network Interface Card (NIC) used in a wired/wireless LAN, for example. It is to be noted that the communicator 190 may have an interface (network I/F) connectable to a network.

1.2.2 Terminal Device

Figure 5:
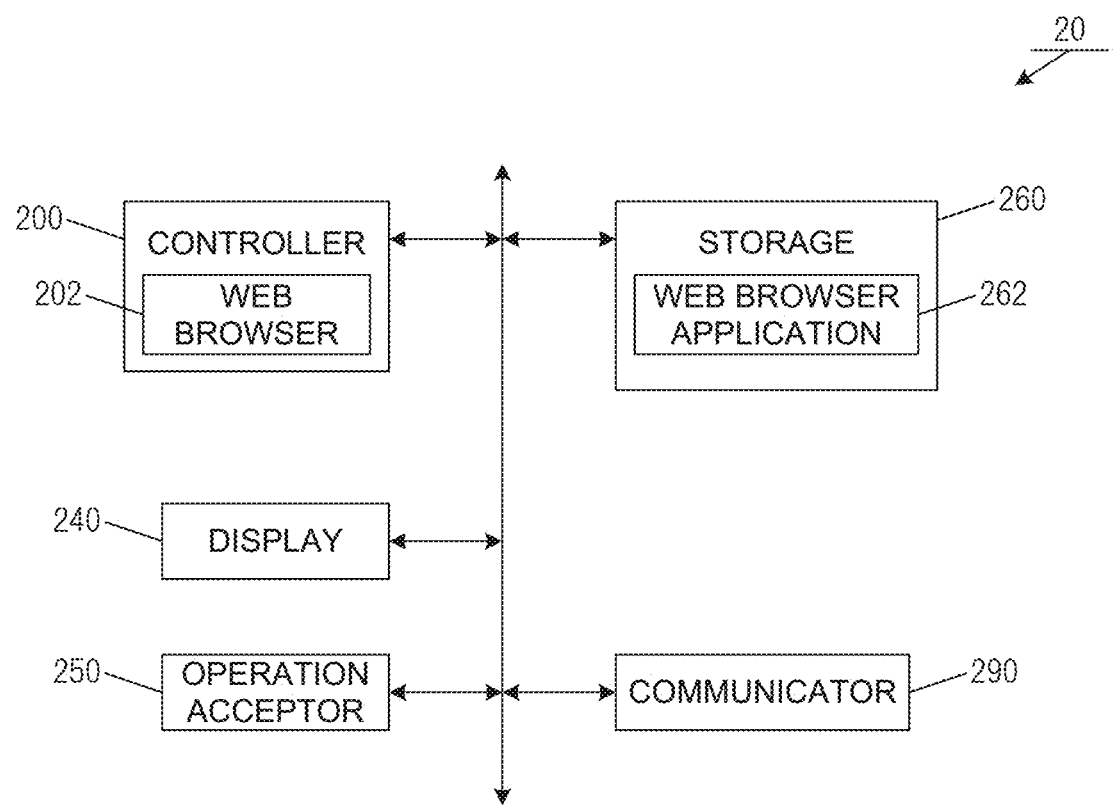
FIG. 5 is a diagram illustrating a functional configuration of a terminal device in the First Embodiment.

FIG. 5 is a diagram illustrating a functional configuration of the terminal device 20. The terminal device 20 includes, for example, a controller 200, a display 240, an operation acceptor 250, a storage 260, and a communicator 290, and is configured by each of the functions connected.

The controller 200 is a function for controlling the entire terminal device 20. The controller 200 realizes various functions by reading and executing various programs stored in the storage 260 and may also be configured by one or a plurality of arithmetic devices (CPU) or the like, for example. Moreover, the controller 200 may also be configured as an SoC having a plurality of functions among the functions explained below.

The controller 200 functions as a Web browser 202 by executing the program stored in the storage 260. The Web browser 202 displays a Web page on the display 240.

The display 240 displays various types of information. The display 240 is configured by a display device such as a Liquid crystal display (LCD), an organic electro-luminescence (EL) display, or a micro Light Emitting Diode (LED) display.

The operation acceptor 250 accepts an operation instruction by the user who uses the terminal device 20. The operation acceptor 250 is configured by an input device such as a key switch (hard key) or a touch sensor. A method of detecting an input by contact (touch) in the touch sensor only needs to be a general detection method such as a resistive film method, an infrared method, an electromagnetic induction method, and a capacitance method. It is to be noted that a touch panel in which the display 240 and the operation acceptor 250 are integrally formed may also be mounted on the terminal device 20.

The storage 260 stores various programs and various types of data required for the operation of the terminal device 20. The storage 260 is configured, for example, by an SSD, which is a semiconductor memory, or a storage device such as an HDD. Moreover, the storage 260 may also be also configured by including a ROM or a RAM. The storage 260 stores a Web-browser application 262 for causing the controller 200 to function as the Web browser 202.

The communicator 290 communicates with other devices such as the server device 10 via a network such as a LAN or a WAN. The communicator 290 may be configured by, for example, a communication device or a communication module such as an NIC used in a wired/wireless LAN. It is to be noted that the communicator 290 may have an interface (network I/F) connectable to a network.

1.2.3 Processing Device

Figure 6:
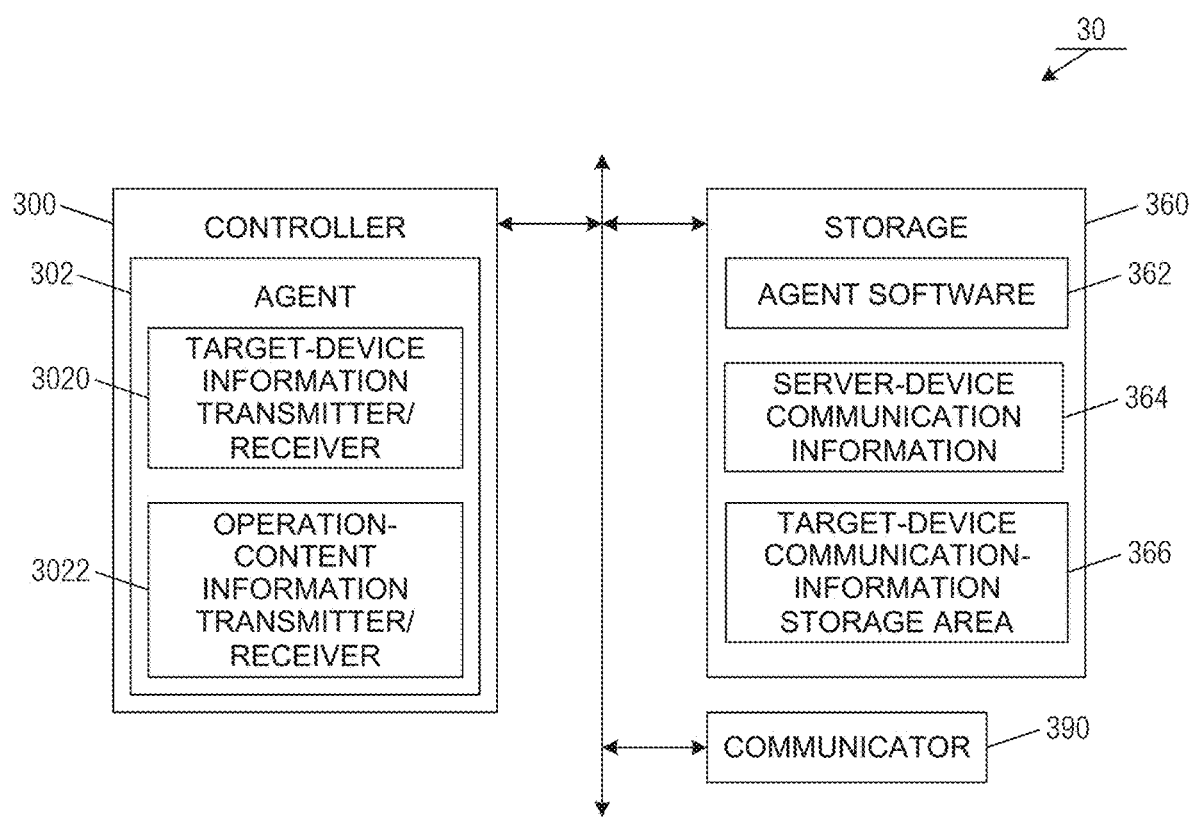
FIG. 6 is a diagram illustrating a functional configuration of a processing device in the First Embodiment.

FIG. 6 is a diagram illustrating a functional configuration of the processing device 30. The processing device 30 includes, for example, a controller 300, a storage 360, and a communicator 390 and is configured by each of the functions connected.

The controller 300 is a function for controlling the entire processing device 30. The controller 300 realizes various functions by reading and executing various programs stored in the storage 360 and is configured by one or a plurality of arithmetic devices (CPU) or the like, for example. Moreover, the controller 300 may also be configured as an SoC having a plurality of functions among the functions explained below.

The controller 300 functions as an agent 302 by executing a program stored in the storage 360.

The agent 302 realizes the function of the agent. The agent 302 may also be, for example, a communication relay or a communication mediation device. In other words, the agent 302 realizes transmission/reception of information between the server device 10 and the target device 40. It is to be noted that a protocol other than a generally known protocol, such as a Hypertext Transfer Protocol (HTTP) or a Remote FrameBuffer (RFB) may be used for the communication between the server device 10 and the agent and the communication between the target device 40 and the agent. The agent 302 functions as a target-device information transmitter/receiver 3020 and an operation-content information transmitter/receiver 3022.

The target-device information transmitter/receiver 3020 acquires target-device information from the target device 40 and transmits the target-device information to the server device 10.

The operation-content information transmitter/receiver 3022 receives the operation-content information transmitted from the server device 10 and transmits the operation-content information to one unit of the target device 40 in which the content of the operation by the user is to be reflected among the target devices 40.

The storage 360 stores various programs and various types of data required for the operation of the processing device 30. The storage 360 may be configured, for example, by an SSD, which is a semiconductor memory, or a storage device such as an HDD. Moreover, the storage 360 may also be configured by including a ROM or a RAM.

The storage 360 stores agent software 362, which causes the controller 300 to function as the agent 302, and server-device communication information 364, which is information used for communication with the server device 10, and secures a target-device communication-information storage area 366 as a storage area.

The server-device communication information 364 includes information (an IP address of the server device 10 or a port number used for communication, for example) required to communicate with the server device 10.

The target-device communication-information storage area 366 stores information (target-device communication information) used to communicate with the target device 40. The target-device communication information includes, as shown in FIG. 7, for example, an ID ("1", for example) for identifying the target device 40 and communication information ("10.36.102.45", for example), which is information used for communication with the target device 40. The target-device communication information only needs to include information capable of identifying the target device 40, and the information for identifying the target device 40 may be information other than the ID (a serial number of the target device 40, for example). Moreover, the communication information is, for example, an IP address of the target device 40, a port number used for communication or the like. The target-device communication information is stored in advance.

The communicator 390 communicates with other devices such as the server device 10 via a network such as a LAN or a WAN. The communicator 390 may be configured by, for example, a communication device or a communication module such as an NIC used in a wired/wireless LAN. It is to be noted that the communicator 390 may have an interface (network I/F) connectable to a network.

1.2.4 Multifunction Peripheral

Figure 8:
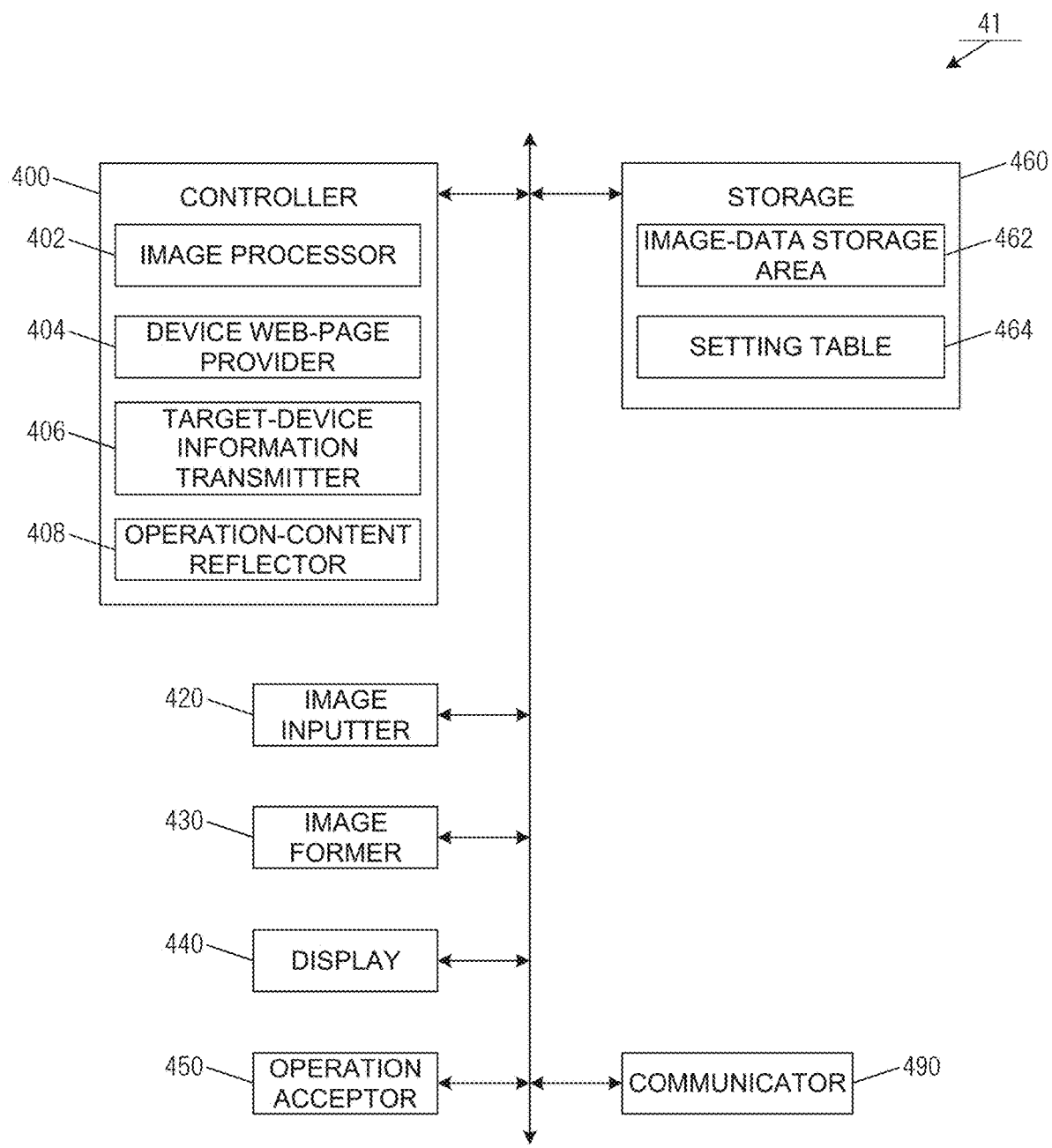
FIG. 8 is a diagram illustrating a functional configuration of a multifunction peripheral in the First Embodiment.

FIG. 8 is a diagram illustrating a functional configuration of a multifunction peripheral 41, which is a type of the target device 40. The multifunction peripheral 41 includes, for example, a controller 400, an image inputter 420, an image former 430, a display 440, an operation acceptor 450, a storage 460, and a communicator 490, and is configured by each of the functions connected.

The controller 400 is a function that controls the entire multifunction peripheral 41. The controller 400 realizes various functions by reading and executing various programs stored in the storage 460 and may be configured by one or a plurality of arithmetic devices (CPU) or the like, for example. Moreover, the controller 400 may also be configured as an SoC having a plurality of functions among the functions explained below.

The controller 400 functions as an image processor 402, a device Web-page provider 404, a target-device information transmitter 406, and an operation-content reflector 408 by executing a program stored in the storage 460.

The image processor 402 executes processing related to various images. The image processor 402 executes sharpening processing and tone conversion processing on an image input via the image inputter 420 and a communicator 490, for example.

The device Web-page provider 404 provides a device Web page to another device via the communicator 490.

The target-device information transmitter 406 transmits information of the own device (target-device information) to the processing device 30. The target-device information transmitter 406 transmits a model name, a series name, a serial number, a device name, a status, an option, setting information, state information, and the like to another device as target-device information. It is to be noted that the target-device information transmitter 406 may include the contents stored in the setting table 464 in the target-device information as the setting information. Moreover, the target-device information transmitter 406 may also include information on the state of the own device (a connection state to a network, a remaining toner amount, a remaining sheet amount, or the like, for example) in the target-device information as the state information.

In a case where operation-content information is received from the processing device 30, the operation-content reflector 408 reflects the content of the operation indicated by the operation content information in the target device 40.

The image inputter 420 inputs an image to the multifunction peripheral 41. The image inputter 420 may be configured by, for example, a scanner device that reads a manuscript placed on a manuscript table. The scanner device is a device that converts an image into an electric signal by an image sensor such as a Charge Coupled Device (CCD) or a Contact Image Sensor (CIS) and quantizes and encodes the electric signal. It is to be noted that the image inputter 420 may input an image stored in a storage medium such as a Universal Serial Bus (USB), or may input an image received from another device via the communicator 490.

The image former 430 forms (prints) the image on a recording medium such as a recording sheet. The image former 430 may be configured by a printing device such as a laser printer that uses electrophotography, for example. The image former 430 feeds a recording sheet from a paper feed tray provided in the multifunction peripheral 41, for example, forms an image on a surface of the recording sheet, and ejects the recording sheet from a sheet ejection tray provided in the multifunction peripheral 41.

The display 440 displays various types of information. The display 440 may be configured by a display device such as an LCD, an organic EL display, or a micro LED display.

The operation acceptor 450 accepts an operation instruction by the user who uses the multifunction peripheral 41. The operation acceptor 450 may be configured by an input device such as a key switch (hard key) or a touch sensor. It is to be noted that a touch panel in which the display 440 and the operation acceptor 450 are integrally formed may be mounted on the multifunction peripheral 41.

The storage 460 stores various programs and various types of data required for the operation of the multifunction peripheral 41. The storage 460 may be configured by an SSD, which is a semiconductor memory, or a storage device such as an HDD, for example. Moreover, the storage 460 may be configured by including a ROM or a RAM. The storage 460 ensures an image-data storage area 462 for storing data of an image input via the image inputter 420 and further stores the setting table 464.

The setting table 464 is a table for storing settings of the multifunction peripheral 41. The setting table 464 is, as shown in FIG. 9, a table in which a setting item name ("HTTP port", for example) and a setting value ("valid", for example) for the setting item name are stored in association with each other, for example. The setting values of the setting table 464 may be stored in advance or may be changeable in accordance with a user's operation.

The communicator 490 communicates with other devices such as the processing device 30 via a network such as a LAN or a WAN. The communicator 490 may be configured by, for example, a communication device or a communication module such as an NIC used in a wired/wireless LAN. It is to be noted that the communicator 490 may have an interface (network I/F) connectable to a network.

1.3 Flow of Processing

1.3.1 Outline of Flow of Processing

Figure 10:
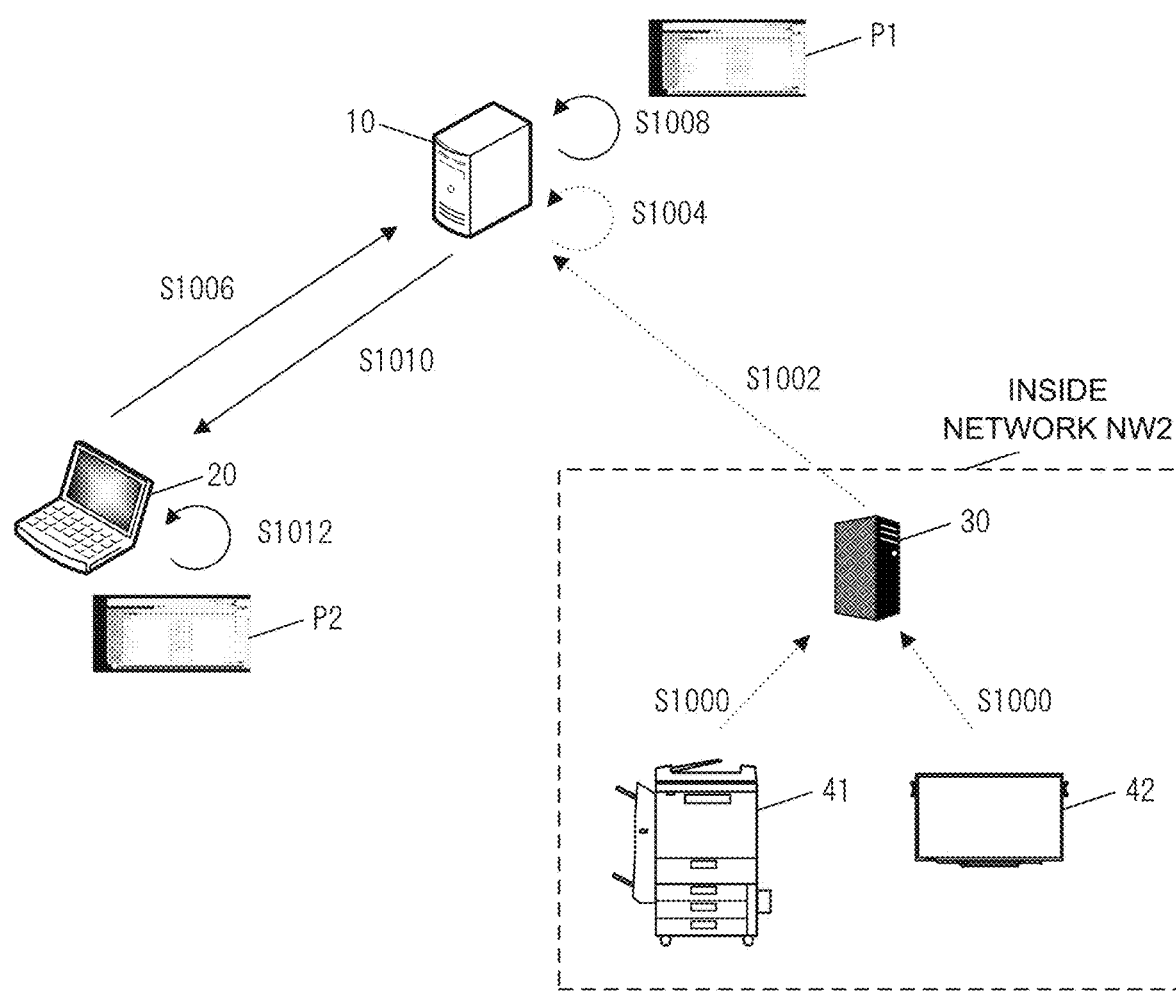
FIG. 10 is a diagram illustrating an outline of processing in the First Embodiment.
Figure 11:
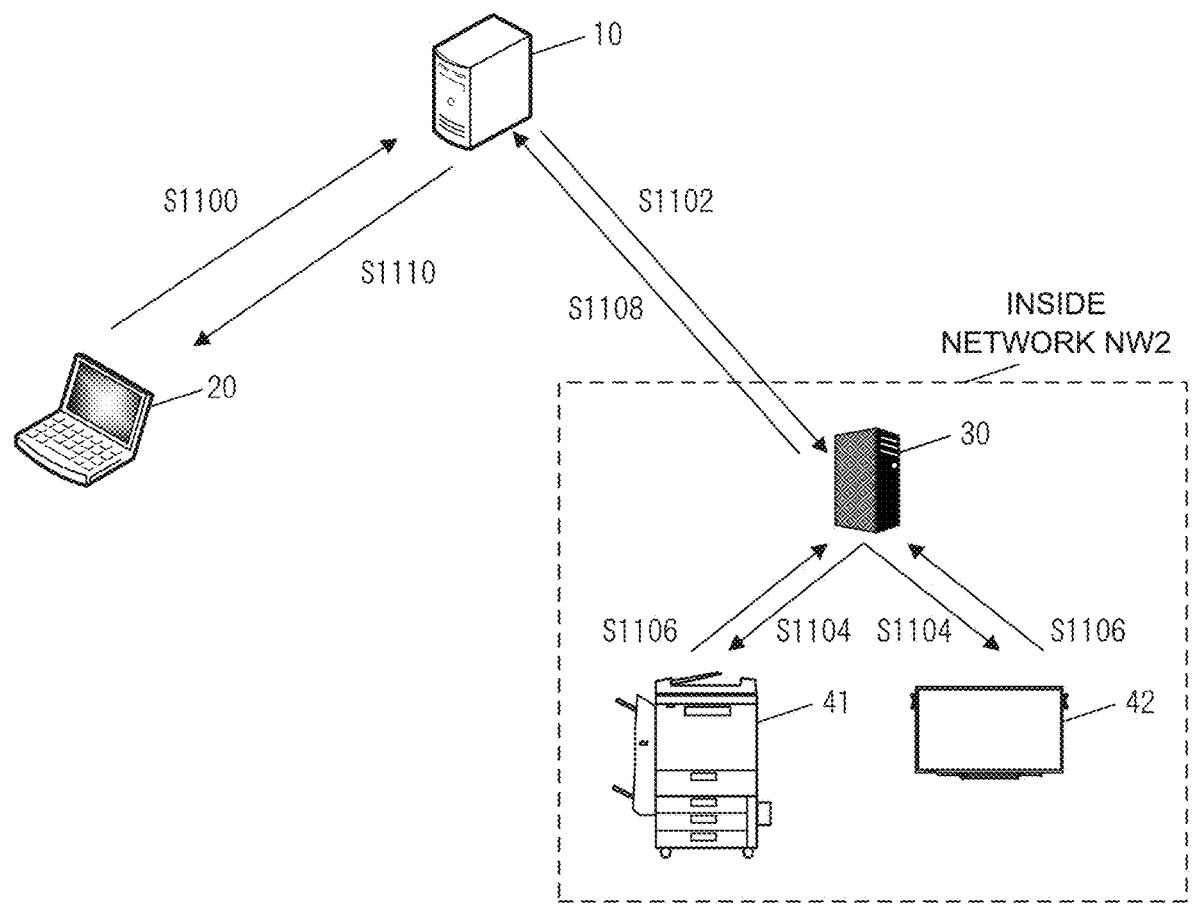
FIG. 11 is a diagram illustrating an outline of processing in the First Embodiment.

An outline of processing executed by the devices included in the system 1 will be explained with reference to FIGS. 10 and 11. First, an outline of processing for displaying a virtual-device Web page will be explained with reference to FIG. 10. The target device 40 (multifunction peripheral 41 or display 42) transmits target-device information to the processing device 30 (S1000). Each target device 40 may transmit the target-device information periodically (every 20 minutes, for example) in accordance with a task scheduled in the system 1 or may transmit the target-device information when a request for the target-device information is received from the processing device 30. The timing at which the target-device information is requested from the processing device 30 may be periodic (every 20 minutes, for example) or may be when the processing device 30 is notified by the server device 10 that acquisition of the target-device information was requested by the user.

Subsequently, the processing device 30 transmits the target-device information to the server device 10 (S1002). The server device 10 receives the target-device information via the communicator 190 and stores the received target-device information in the target-device information-storage area 162 (S1004).

Subsequently, an access request for a device Web page is transmitted from the terminal device 20 to the server device 10 (S1006). At this time, information (an ID or a serial number, for example) (hereinafter, referred to as identification information) for identifying (specifying) the target device 40 that provides the device Web page to be accessed is transmitted. It is to be noted that a list of the target devices 40 may be transmitted from the server device 10 to the terminal device 20. In this case, the terminal device 20 only needs to transmit the identification information of one unit of the target device 40 selected from the list to the server device 10.

When the server device 10 receives an access request for the device Web page and the identification information, the server device 10 reads the target-device information of the target device 40 corresponding to the identification information and generates a virtual-device Web page (P1) on the basis of the target-device information (S1008).

Subsequently, the server device 10 transmits, via the communicator 190, information for displaying the virtual-device Web page to the terminal device 20 that transmitted the access request for the device Web page (S1010). The virtual-device Web page is, for example, HTML data, image data, or CSS data. It is to be noted that, in this Embodiment, information such as HTML data used to display the virtual-device Web page is referred to as display information. As described above, the server device 10 causes the terminal device 20 to display the virtual-device Web page by transmitting the display information to the terminal device 20. The terminal device 20 can display the virtual-device Web page (P2) on the basis of the received display information. Moreover, the user who uses the terminal device 20 can browse information of the target device 40 or perform an operation of changing the setting of the target device 40 via the virtual-device Web page (S1012).

Subsequently, with reference to FIG. 11, an outline of processing executed when the user performs an operation on the virtual-device Web page will be explained. When an operation is performed by the user on the displayed virtual-device Web page, the terminal device 20 transmits the operation-content information to the server device 10 (S1100). The server device 10 transmits the operation-content information to the processing device 30 (S1102).

The processing device 30 transmits the operation-content information to the target device 40 which causes the content of the operation performed by the user to be reflected on the basis of the operation-content information received from the server device 10 by means of the function of the agent (S1104). The target device 40 that received the operation-content information from the processing device 30 causes the content of the operation to be reflected and transmits response information (response) that is information indicating a result of reflection of the content of the operation to the processing device 30 (S1106). The response information (response) is information received from the target device 40, which is a transmission destination of the operation-content information. The response information may be, for example, information indicating that the operation based on the operation-content information has been reflected or information indicating a result of the reflection (for example, setting information after the content of the operation has been reflected). Moreover, the response information may also be information indicating an error when the operation based on the operation-content information was not reflected.

The processing device 30 transmits the received response information to the server device 10 by the function of the agent (S1108). The server device 10 transmits the received response information to the terminal device 20 (S1110). The terminal device 20 notifies the user of the content of the received response information by a method such as displaying.

1.3.2 Processing of Server Device

Figure 12:
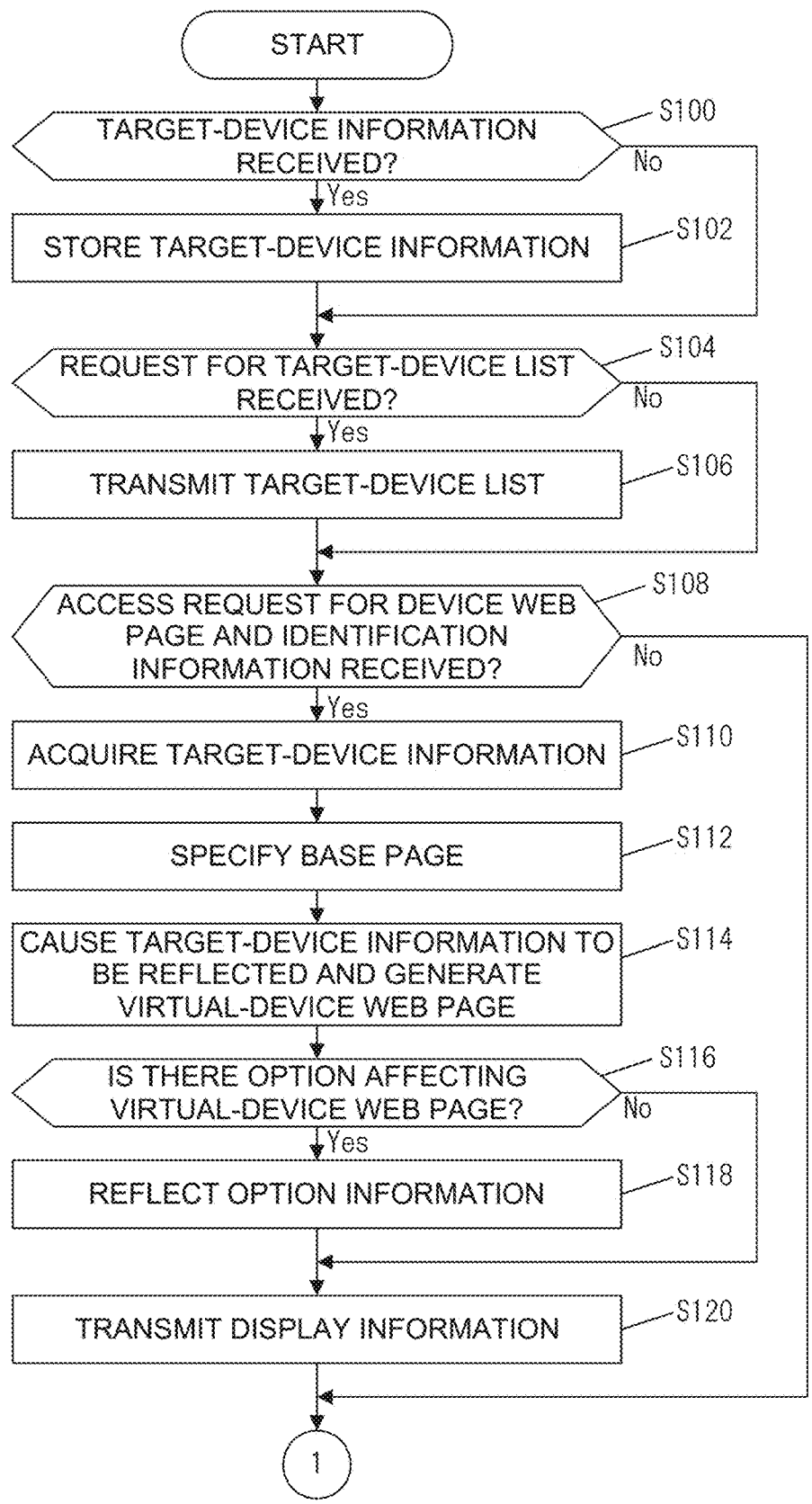
FIG. 12 is a flowchart of main processing of the server device in the First Embodiment.
Figure 13:
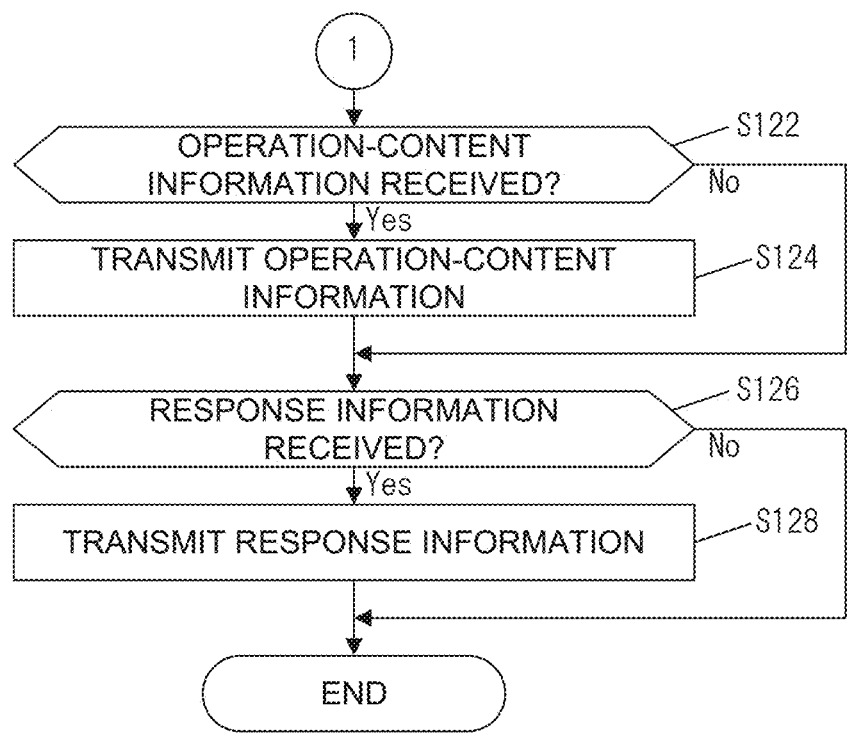
FIG. 13 is a flowchart of the main processing of the server device in the First Embodiment.

FIGS. 12 and 13 are flowcharts illustrating a flow of main processing (main processing) executed by the server device 10. First, the processing described in FIG. 12 will be explained. In a case where the target-device information was received from the processing device 30, the controller 100 stores the received target-device information in the target-device information-storage area 162 (Step S100; Yes→Step S102). On the other hand, in a case where it is determined that the target-device information has not been received, the controller 100 omits the processing at Step S102 (Step S100; No).

Subsequently, in a case where a request for a target device list, which is a list of the target devices 40, is received from the terminal device 20, the Web server 102 generates the target device list and transmits the target device list to the device that transmitted the request for the target device list (Step S104; Yes→Step S106). The target device list is a list in which information of the target device 40 is collected for each target device 40. For example, the Web server 102 reads the target-device information stored in the target-device information-storage area 162 and generates a list in which the IDs, the model names, the series names, the serial numbers, and the statuses included in the read target-device information are collected for each target device 40. The target device list may also be, for example, HTML data. As described above, the Web server 102 enables the device that transmitted the request for the target device list to select one target device among a plurality of the target devices 40. On the other hand, in a case where it is determined that the request for the target device list has not been received, the Web server 102 omits the processing at Step S106 (Step S104; No).

Subsequently, the virtual-device Web-page generator 104 determines whether or not an access request for a device Web page and identification information have been received from another device (the terminal device 20, for example) (Step S108).

When the virtual-device Web-page generator 104 receives the access request for the device Web page and the identification information, the virtual-device Web-page generator 104 acquires the target-device information of the target device 40 corresponding to the identification information from the target-device information-storage area 162 (Step S108; Yes→Step S110). Moreover, the virtual-device Web-page generator 104 specifies the base page of the target device 40 corresponding to the identification information received at Step S108 (Step S112).

Here, the virtual-device Web-page generator 104 specifies the base page from the model name or the series name of the target device 40 corresponding to the identification information. For example, the virtual-device Web-page generator 104 acquires a model name and a series name included in the target-device information acquired at Step S110. Subsequently, the virtual-device Web-page generator 104 reads base-page correspondence information including the acquired model name and series name from the base-page correspondence information-storage area 166 and acquires a base-page storage location included in the read base-page correspondence information. As described above, the virtual-device Web-page generator 104 can specify the base page of the target device 40 corresponding to the identification information by acquiring the base-page storage location.

Subsequently, the virtual-device Web-page generator 104 generates a virtual-device Web page by causing the target-device information to be reflected in the base page specified at Step S112 (Step S114).

For example, the virtual-device Web-page generator 104 generates a virtual-device Web page in which information such as setting information included in the target-device information acquired at Step S110 is displayed as text or displayed in a settable (changeable) manner on the specified base page. That is, the virtual-device Web-page generator 104 extracts items that can be set and information that can be displayed on the device Web page of the target device 40 identified by the identification information from the target-device information and embeds the extracted items that can be set and information that can be displayed in the base page.

For example, the virtual-device Web-page generator 104 embeds setting display information (information for displaying an input form such as a drop-down list or a text box, for example), which is information for displaying a user interface capable of setting the contents (setting values) of items based on the setting information for the setting information included in the target-device information. On the other hand, with respect to the state information included in the target-device information, the virtual-device Web-page generator 104 embeds the content (state value) of an item based on the state information, that is, state display information (information for displaying text, for example) which is information for displaying a user interface for displaying the state of the target device 40.

It is to be noted that the virtual-device Web-page generator 104 may set, as the state display information, an item which is included as the setting information in the target-device information but cannot be set in the virtual-device Web page serving as the user interface displayed on the terminal device 20. That is, the virtual-device Web-page generator 104 may display the setting value of the item that cannot be set by text instead of a user interface such as a drop-down list. It is to be noted that the item that cannot be set on the virtual-device Web page is, for example, an item for which setting change is not supported in the target device 40. The items that cannot be set on the virtual-device Web page are determined in advance by the target device 40, for example. The virtual-device Web-page generator 104 stores in advance an item that does not have a function of accepting a setting change, or acquires information of an item that does not have a function of accepting a setting change from the target device 40 via the processing device 30.

As described above, the virtual-device Web-page generator 104 specifies the base page corresponding to the target device 40 from the identification information of the target device 40 and embeds the information based on the device information and the option information in the base page, whereby the display information of the virtual-device Web page is generated.

It is to be noted that the information included in the target-device information and a page or a position at which the information is embedded only needs to be defined in advance. For example, a table in which information included in the target-device information is associated with a page or a position to be embedded is stored in advance in the storage 160 of the server device 10. In this case, the virtual-device Web-page generator 104 only needs to embed information included in the target-device information in the base page with reference to the table.

Moreover, if there is an option that influences the virtual-device Web page, the virtual-device Web-page generator 104 causes information on the option to be reflected in the virtual-device Web page (Step S116; Yes→Step S118).

The option that influences the virtual-device Web page is an option of the target device 40 identified by the identification information and is an option having information to be additionally displayed on the virtual-device Web page generated at Step S114. For example, the virtual-device Web-page generator 104 extracts the option information from the target-device information acquired at Step S110. Moreover, the virtual-device Web-page generator 104 determines presence/absence of an item that can be set and information that can be displayed on the device Web page of the target device 40 regarding the option of the target device 40 on the basis of the extracted option information. If there is an item that can be set or information that can be displayed, the virtual-device Web-page generator 104 determines that there is an option that influences the virtual-device Web page and adds the item that can be set or information that can be displayed regarding the option to the virtual-device Web page. For example, the virtual-device Web-page generator 104 causes the numbers of the finisher trays to be used to be displayed in a selectable manner on the virtual-device Web page of the target device 40 having the finisher tray option. As described above, when the target device 40 is provided with an optional device, the virtual-device Web-page generator 104 can cause the information related to the optional device to be displayed on the virtual-device Web page generated at Step S114.

It is to be noted that, if there is no option that influences the virtual-device Web page, the virtual-device Web-page generator 104 omits the processing at Step S118 (Step S116; No).

Subsequently, the Web server 102 transmits the display information of the virtual-device Web page to the device (the terminal device 20, for example) that transmitted the access request and the identification information of the device Web page (Step S120). On the other hand, when it is determined at Step S108 that the access request for the device Web page and the identification information have not been received, the controller 100 omits the processing from Step S110 to Step S118 (Step S108; No).

Subsequently, the processing described in FIG. 13 will be explained. In a case where the controller 100 receives the operation-content information from the terminal device 20, the controller 100 transmits the received operation-content information to the processing device 30 (Step S122; Yes→Step S124). As described above, the controller 100 causes the operation input on the virtual-device Web page to be reflected in one unit of the target device 40 corresponding to the identification information received at Step S108. On the other hand, if it is determined that the operation-content information has not been received, the controller 100 omits the processing at Step S124 (Step S122; No).

Subsequently, in a case where the response information is received from the processing device 30, the controller 100 transmits the response information to the device that transmitted the operation-content information received at Step S120 (Step S126; Yes→Step S128). On the other hand, if it is determined that the response information has not been received, the controller 100 omits the processing at Step S128 (Step S126; No).

1.3.3 Terminal Device

Figure 14:
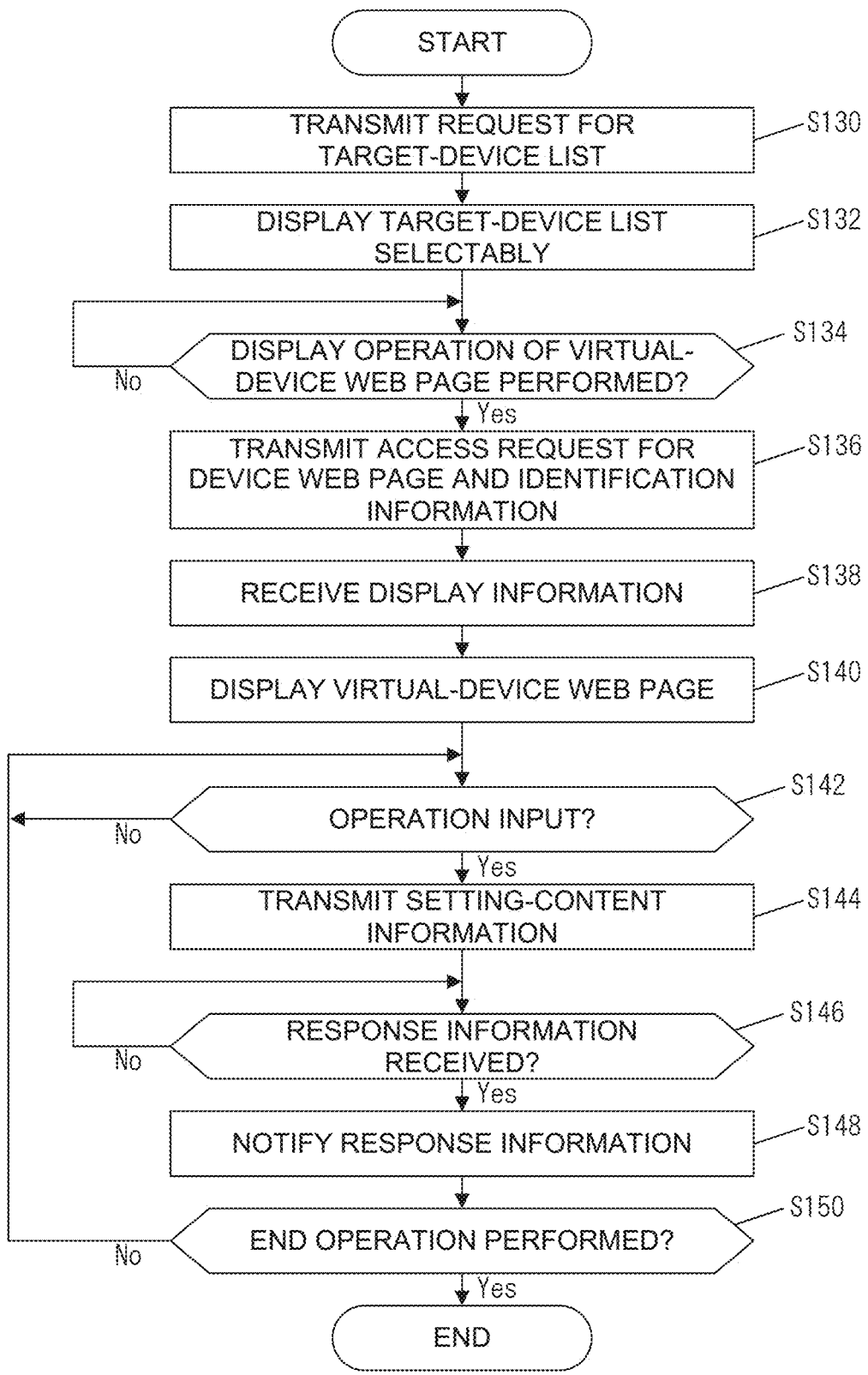
FIG. 14 is a flowchart of main processing of a terminal device in the First Embodiment.

FIG. 14 is a flowchart illustrating a flow of main processing (main processing) executed by the terminal device 20. It is to be noted that the processing illustrated in FIG. 14 is executed when the user performs an operation to cause a screen for managing the target device 40 to be displayed via the terminal device 20. It is to be noted that, in the following explanation, it is assumed that the Web browser 202 displays the screen for management.

First, the Web browser 202 transmits a request for a target device list to the server device 10 (Step S130). Upon receipt of the target device list, the Web browser 202 displays the target device list on the display 240 in a selectable manner (Step S132).

Subsequently, the Web browser 202 determines whether one unit of the target device 40 was selected from the target device list by the user and a display operation of the virtual-device Web page of the target device 40 was performed or not (Step S134). The Web browser 202 repeats the processing at Step S134 until the display operation of the virtual-device Web page is performed (Step S134; No). On the other hand, when the display operation of the virtual-device Web page was performed, the Web browser 202 transmits an access request for the virtual-device Web page and the identification information of the target device 40 selected by the user to the server device 10 (Step S134; Yes→Step S136). It is to be noted that the identification information of the target device 40 is, for example, the ID of the target device 40 selected from the target device list received at Step S132.

It is to be noted that the Web browser 202 may display a detail screen of the target device 40 when one unit of the target device 40 was selected from the target device list or may determine that the display operation of the virtual-device Web page was performed when an operation for accessing the device Web page was performed from the detail screen. That is, the display operation of the virtual-device Web page may also be performed from the target device list or the display operation of the virtual-device Web page may also be performed after the detailed screen of the target device 40 is displayed. The detail screen may be generated by the server device 10 or may also be generated by the terminal device 20. In a case of generation by the terminal device 20, for example, the server device 10 causes information (detail information) to be displayed on the detail screen to be included in the target device list. When the target device 40 is selected by the user, the terminal device 20 only needs to display the detail information corresponding to the target device 40.

Subsequently, the Web browser 202 receives the display information from the server device 10 (Step S138) and displays the virtual-device Web page on the basis of the received display information (Step S140). For example, when the setting display information is included in the display information, the Web browser 202 displays a user interface (a drop-down list or a text box, for example) for setting a setting value related to a setting item of the target device 40. Moreover, when the state display information is included in the display information, the Web browser 202 displays a user interface (a text, for example) for displaying a state value related to the state item of the target device 40. It is to be noted that the Web browser 202 displays texts and images and adjusts a layout on the basis of the display information. As a result, the terminal device 20 can virtually display the device Web page of the target device 40 as a virtual-device Web page that imitates the device Web page.

Subsequently, the controller 200 determines whether or not an operation has been input from the user (Step S142). The controller 200 repeats the processing at Step S142 until an operation is input (Step S142; No). On the other hand, when the operation is input, the controller 200 transmits operation-content information including information indicating the content of the operation and identification information for identifying the target device 40 in which the content of the operation is to be reflected to the server device 10 (Step S142; Yes→Step S144).

Subsequently, the controller 200 determines whether or not the response information has been received from the server device 10 (Step S146). The controller 200 repeats the processing at Step S146 until the response information is received (Step S146; No). On the other hand, in a case where the response information was received, the controller 200 notifies the user of the response information (Step S146; Yes→Step S148). For example, the controller 200 causes a message indicating the content of the response information to be displayed on the display 240.

Subsequently, the controller 200 determines whether or not an end operation has been performed (Step S150). The end operation is an operation for ending the management of the target device 40. If the end operation is performed, the controller 200 ends the processing shown in FIG. 14 (Step S150; Yes). On the other hand, if the end operation has not been performed, the controller 200 returns to Step S142 (Step S150; No→Step S142).

1.3.4 Processing Device

Figure 15:
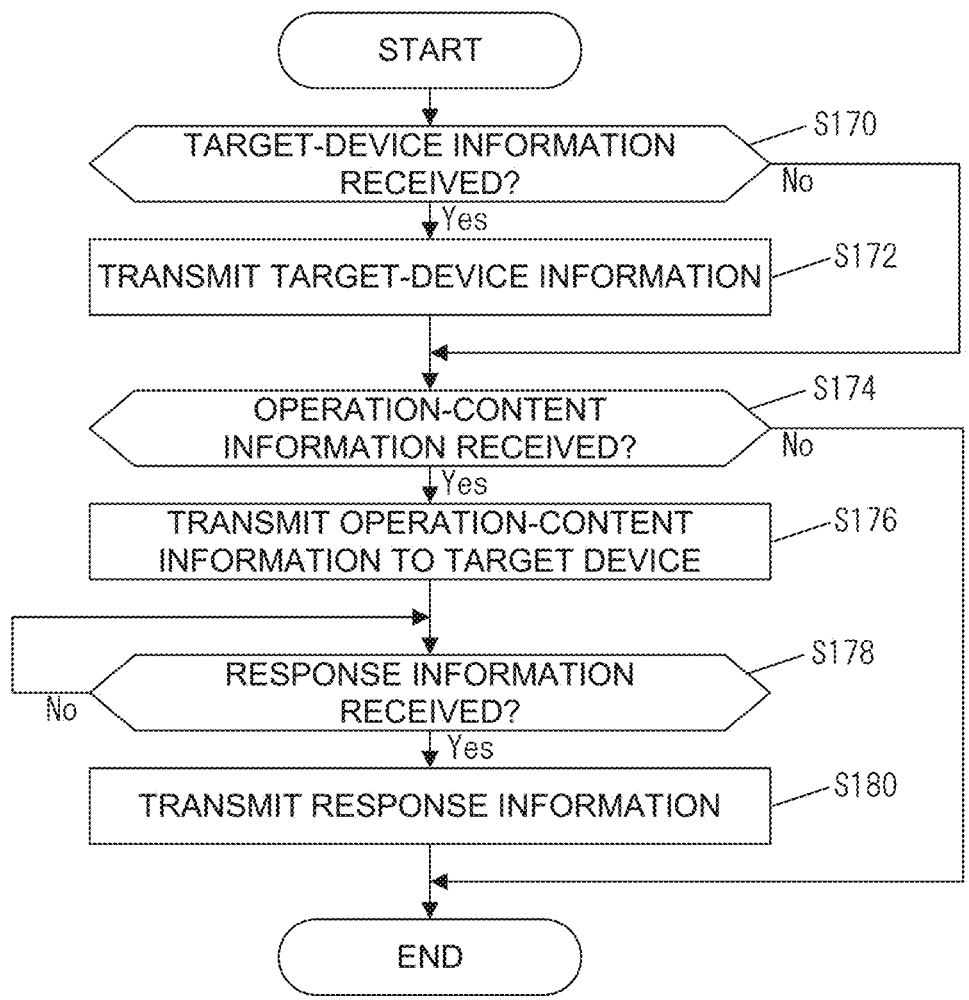
FIG. 15 is a flowchart of main processing of the processing device in the First Embodiment.

FIG. 15 is a flowchart illustrating a flow of main processing (main processing) executed by the processing device 30. The processing shown in FIG. 15 is executed by the controller 300 of the processing device 30 by reading a program stored in the storage 360.

First, in a case where the target-device information was received from the target device 40, the target-device information transmitter/receiver 3020 transmits the target-device information to the server device 10 (Step S170; Yes→Step S172). For example, the target-device information transmitter/receiver 3020 acquires the target-device information by transmitting a request for the target-device information to the target device 40 or receiving the target-device information unilaterally transmitted from the target device 40. Moreover, the target-device information transmitter/receiver 3020 refers to the server-device communication information 364 and transmits the target-device information to the server device 10. On the other hand, in a case where the target-device information has not been received, the controller 300 (target-device information transmitter/receiver 3020) omits the processing at Step S172 (Step S170; No).

Subsequently, in a case where the operation-content information was received from the server device 10, the operation-content information transmitter/receiver 3022 transmits the operation-content information to the target device 40 of the operation target (Step S174; Yes→Step S176). For example, the operation-content information includes the ID of the target device 40 as information for identifying the target device 40 in which the content of the operation of the user is to be reflected. Therefore, the operation-content information transmitter/receiver 3022 can acquire the communication information of the target device 40, which is the transmission destination of the operation-content information by reading processing device information including the same ID as the ID of the target device 40 included in the operation-content information. The operation-content information transmitter/receiver 3022 only needs to transmit the operation-content information using the acquired communication information. Moreover, the operation-content information includes information of a setting value input by the user via the virtual-device Web page. The operation-content information transmitter/receiver 3022 can cause the setting value to be reflected in the target device by transmitting the information of the setting value to the target device 40 of the operation target.

Subsequently, the controller 300 determines whether or not the response information was received from the target device 40, which is a transmission destination of the operation-content information (Step S178). The controller 300 repeats the processing at Step S178 until the response information is received (Step S178; No). On the other hand, in a case where the response information was received, the controller 300 transmits the response information to the server device 10 (Step S178; Yes→Step S180). It is to be noted that, when it is determined at Step S174 that the operation-content information was not received, the controller 300 omits the processing from Step S176 to Step S180 (Step S174; No).

1.3.5 Target Device

Figure 16:
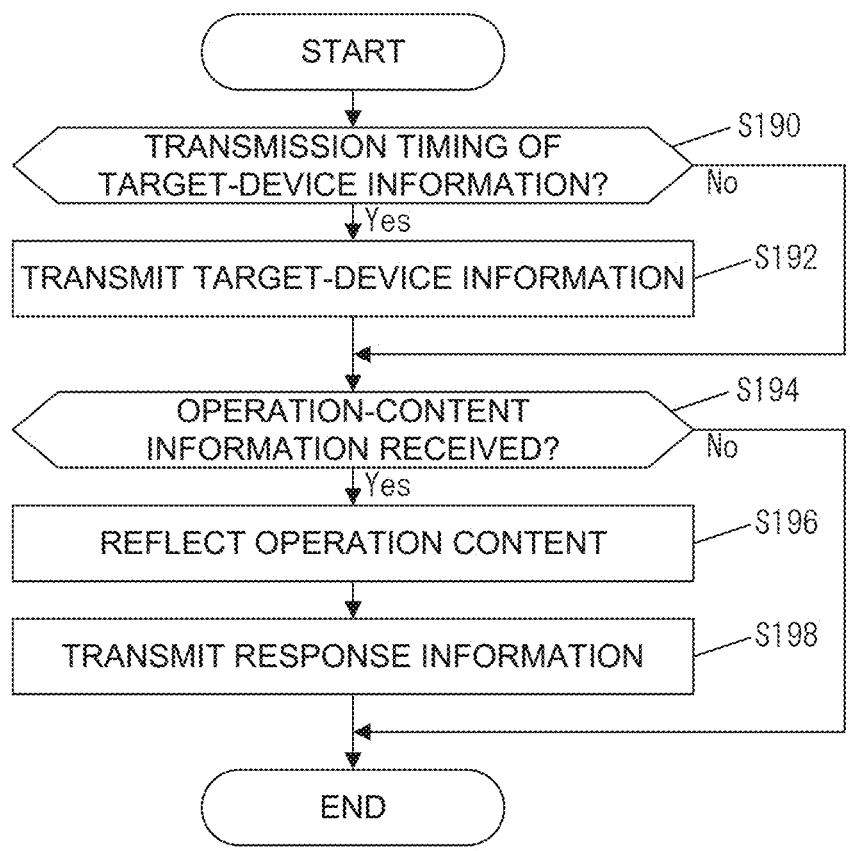
FIG. 16 is a flowchart of main processing of the target device in the First Embodiment.

FIG. 16 is a flowchart illustrating a flow of main processing (main processing) executed by the target device 40. The processing shown in FIG. 16 is executed by the controller 400 of the target device 40 by reading a program stored in the storage 460.

First, when it is timing to transmit the target-device information, the target-device information transmitter 406 transmits the target-device information to the processing device 30 (Step S190; Yes→Step S192). The timing of transmitting the target-device information is, for example, when a request for the target-device information is transmitted from the processing device 30. It is to be noted that the timing at which the target-device information is transmitted may be time determined in advance or it may be transmitted when time determined in advance (20 minutes, for example) has elapsed since the target-device information was lastly transmitted. On the other hand, when it is not the timing to transmit the target-device information, the target-device information transmitter 406 omits the processing at Step S192 (Step S190; No).

Subsequently, in a case where the operation-content information was received from the processing device 30, the operation-content reflector 408 reflects the contents of the operation performed by the user on the basis of the operation-content information (Step S194; Yes→Step S196). In addition, as a response to the reception of the operation-content information, the operation-content reflector 408 transmits response information including information indicating that the operation content has been reflected, information indicating a result of reflection of the operation content and the like to the processing device 30 (Step S198). It is to be noted that, when it is determined at Step S194 that the operation-content information was not received, the operation-content reflector 408 omits the processing at Step S196 and Step S198 (Step S194; No).

1.4 Operation Example

Figure 17:
FIG. 17 is a diagram illustrating an operation example in the First Embodiment.
Figure 18:
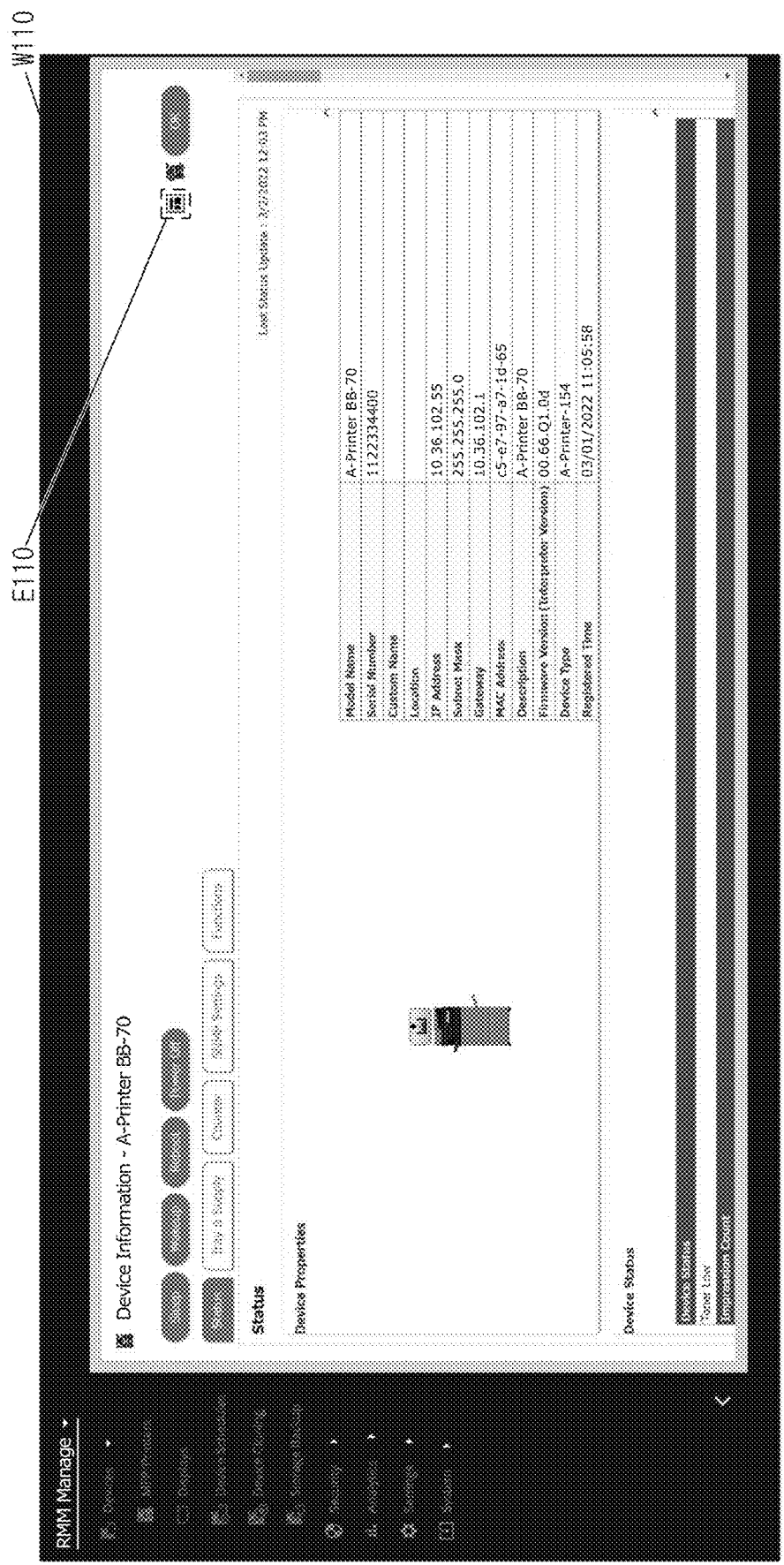
FIG. 18 is a diagram illustrating the operation example in the First Embodiment.
Figure 19:
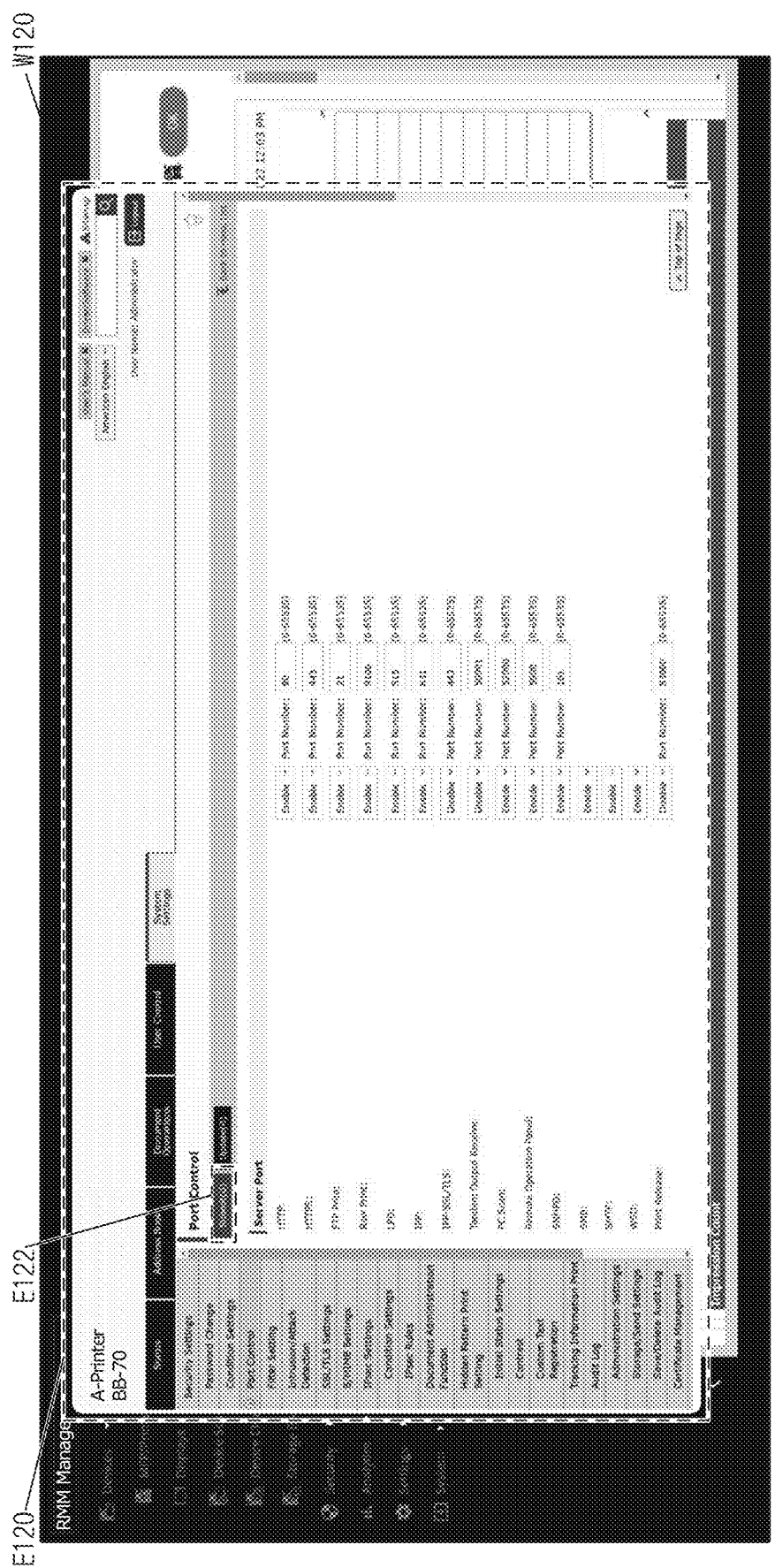
FIG. 19 is a diagram illustrating the operation example in the First Embodiment.

An operation example of this Embodiment will be explained with reference to FIGS. 17 to 19. FIGS. 17 to 19 are diagrams illustrating screen examples of a screen displayed on the terminal device 20.

FIG. 17 is a screen example of a screen W100 displaying the target device list. In the target device list, information such as a status, a model name, a serial number, an IP address, and a device name of the target device 40 is displayed for each target device 40. Moreover, the model names are displayed in a selectable manner. The user can cause a detail screen of the selected target device 40 to be displayed by selecting the model name (E100 in FIG. 17, for example).

FIG. 18 is a screen example of a detail screen W110 of the target device 40. The detail screen W110 includes a button E110 for accessing a device Web page. The user can cause the virtual-device Web page of the target device 40 to be displayed by selecting the button E110.

FIG. 19 is a diagram illustrating a screen example of a screen W120 displayed when the button E110 is selected in the detail screen W110. A virtual-device Web page is displayed on the screen W120. The virtual-device Web page may be displayed by being superimposed on the detail screen W110 as in an area E120 in FIG. 19 or may be displayed by switching the detail screen W110.

Moreover, a Submit button E122 for transmitting the content of the operation performed on the virtual-device Web page is displayed on the virtual-device Web page. The user changes the settings on the virtual-device Web page and then, presses the Submit button E122. When the Submit button E122 is pressed, the setting content information (setting change request) is transmitted to the target device 40 via the processing device 30. As a result, the user can cause the content of the setting to be reflected in the target device 40.

It is to be noted that the aforementioned explanation is an example of the processing, and a part of the processing may be changed as long as the virtual-device Web page is displayed on the terminal device 20 via the server device 10. For example, in the aforementioned explanation, the processing that the server device 10 embeds the target-device information in the base page was explained, but the processing of embedding the target-device information may be executed by the terminal device 20. For example, the server device 10 transmits the base page and the information of the target device 40 (target-device information or the information to be embedded in the base page) to the terminal device 20, and the terminal device 20 only needs to execute processing of embedding the information of the target device 40 in the base page and to display the Web page after the processing. In this case, the base page is stored in the terminal device 20.

Moreover, in the aforementioned explanation, it was explained such that, when the response information is transmitted from the target device 40, the terminal device 20 displays a message indicating the content of the response information, but another method may be used. For example, when the response information was received, the server device 10 may update the display content of the virtual-device Web page on the basis of the response information. Specifically, the server device 10 updates the virtual-device Web page generated before the response information was received to a virtual-device Web page in a state after the operation by the user was performed (the virtual-device Web page after the result of the setting change operation is reflected, for example). Then, the server device 10 transmits the display information of the updated virtual-device Web page to the terminal device 20. As a result, the updated virtual-device Web page is displayed on the terminal device 20. The user can confirm that the operation was reflected by viewing the updated virtual-device Web page.

In the aforementioned explanation, it was explained such that the virtual-device Web page that reproduces the device Web page provided by the target device 40 is displayed by the Web browser as the user interface related to the target device 40 on the basis of the target-device information of the target device 40 (second device). However, the user interface related to the target device 40 (second device) may also be virtually displayed in a manner other than the Web page. For example, the terminal device 20 may install an application for setting the target device 40 or the like, acquire the device information of the target device 40 from the server device 10 on the application, and virtually display the user interface displayed on the target device 40 on the basis of the acquired device information.

Moreover, when the server device 10 receives the identification information of the target device 40 as the access request for the device Web page from the terminal device 20, the server device 10 may request the processing device 30 functioning as the agent to transmit the target-device information of the target device 40. As described above, the server device 10 can acquire the latest target-device information of the target device 40 at the time when the target device 40 was selected by the user and generate a virtual-device Web page in which the latest target-device information is reflected.

Moreover, in the aforementioned explanation, it was explained that the target device 40 is the multifunction peripheral 41, but the target device 40 may be the display device 42, a Web camera, or an Internet of Things (IOT) home appliance such as an air conditioner or a refrigerator. That is, the target device 40 may be any device that provides a device Web page, includes the target-device information transmitter 406 and the operation-content reflector 408, and executes the processing shown in FIG. 16.

Moreover, in the aforementioned explanation, it was explained that the agent 302 is realized by installing the agent software 362, but the agent 302 may be realized by a circuit or dedicated hardware.

Moreover, in the aforementioned explanation, it was explained that one device (processing device 30) among the plurality of devices connected to the network NW2 (second network) has the agent, but one device among the target devices 40 may have the agent. In this case, the target device 40 having the agent may acquire the target-device information of the own device and transmit the target-device information to the server device 10, in addition to the processing of acquiring the target-device information of another target device 40 and transmitting the target-device information to the server device 10. Moreover, in this case, when the target device 40 having the agent receives the operation-content information from the server device 10, the target device 40 causes the operation of the user to be reflected in the own device or transmits the operation-content information to another target device 40.

Moreover, in the aforementioned explanation, it was explained that the terminal device 20 is connected to the network NW1 (first network), but the terminal device 20 may also be connected to the network NW2 (second network). In this case, the terminal device 20 connected to the network NW2 can display the virtual-device Web page by communicating with the server device 10 connected to the network NW1. For example, when the user cannot communicate with the target device 40 even though the user connects the terminal device 20 to the network NW2, the user can cause the terminal device 20 to display the virtual-device Web page of the target device 40 via the server device 10. As a result, the user can change the setting of the desired target device 40 via the virtual-device Web page displayed on the terminal device 20.

As described above, in the system in this Embodiment, the server device installed on the cloud acquires information of various devices (target-device information) acquired from the target device and information of options via the processing device in which the function of the agent is realized. Moreover, the server device generates a virtual-device Web page reproducing the device Web page provided by the target device by embedding the acquired information in the base page corresponding to the target device and causes it to be displayed on the terminal device operated by the user. By operating the virtual-device Web page, the user can perform operations such as displaying information of the target device and changing settings with the same operational feeling as the device Web page provided by the target device, without directly accessing the target device.

Moreover, the system of this Embodiment reflects the operation input to the virtual-device Web page on the target device via the processing device in which the function of the agent is realized. As a result, the system of this Embodiment can cause the user to perform the same operation as the setting operation performed on the device Web page in a pseudo manner with the same operational feeling. That is, the user can also transmit and reflect an operation such as a setting change performed on the virtual-device Web page to the target device via the processing device in which the function of the agent is realized.

In the system of this Embodiment, the server device and a plurality of target devices communicate with each other by means of communication between the server device and the processing device functioning as the agent so that the target-device information and the operation-content information are transmitted/received. As a result, the user can limit setting of permission to a network access performed to enable the communication from the Internet side only to the setting to permit the communication between the server device and the processing device functioning as the agent, and the setting such as opening of the port in accordance with the number of target devices becomes unnecessary. Moreover, as a protocol used for the communication between the server device and the processing device functioning as the agent, a protocol other than a generally known protocol may be used as long as the server device and the processing device functioning as the agent can communicate with each other. As described above, the system of this Embodiment can cause the device Web page to be displayed without creating a new security hole for directly accessing the target device connected to the internal network from the external network.

Moreover, the virtual-device Web page is displayed by communication conducted between the terminal device and the server device. Therefore, the terminal device does not need to cause the device Web page of the target device to be displayed via the external network and the internal network. As described above, the system of this Embodiment can simplify the communication path required for the display of the device Web page so that the performance related to the display of the device Web page can be prevented from deteriorating.

2. Second Embodiment

The Second Embodiment in which, in addition to the processing described in the First Embodiment, regarding a setting item for which a change of a setting value via an external network (cloud) is prohibited, the prohibition of the change of the setting value is displayed on the virtual-device Web page visually recognizably for the user. In this Embodiment, FIG. 12 of the First Embodiment is replaced with FIG. 20. The same signs are given to the same functions and processing, and explanation thereof will be omitted.

The setting items of the target device 40 include some setting items for which a setting change or display of setting contents via a cloud (the Internet such as a WAN) is prohibited. The setting items for which the setting change or the display of the setting contents via the cloud is prohibited are, for example, a setting item for which the target device 40 does not have an interface for the setting change or the display of the setting contents via the cloud, or a setting item for which the setting change or the display of the setting contents via the cloud is restricted due to security reason or the like. The server device 10 transmits, to the terminal device 20, information for displaying the prohibition of the setting change or the display of the setting contents visually recognizably for the user for the setting item for which the setting change or the display of the setting contents via the cloud is prohibited. Moreover, the terminal device 20 displays the received information to notify the user of the setting item for which the setting change and the display of the setting contents via the cloud are prohibited.

The information displaying that the setting change or the display of the setting contents is prohibited visually recognizably for the user may be, for example, a message displayed in a pop-up manner on the terminal device 20 or a message embedded in the virtual-device Web page. In the following explanation, processing for notifying a user that a setting change or display of setting contents is prohibited by displaying a message embedded in a virtual-device Web page will be described.

It is to be noted that, regarding the setting item for which the setting change or the display of the setting contents via the cloud is prohibited, it may be so configured that the server device 10 grasps the restriction for each model or series of the target device 40 in advance, for example. In this case, the server device 10 stores, for each model or series of the target device 40, a setting item for which a setting change or display of setting contents via the cloud is prohibited, for example. It is to be noted that the server device 10 may acquire the setting item for which the setting change or the display of the setting content via the cloud is prohibited from the target device 40 via the processing device 30 functioning as the agent. Moreover, among the base pages stored in the server device 10, a message indicating that a setting change is prohibited may be embedded in advance in a page including a setting item for which a setting change or display of setting contents via the cloud is prohibited in advance.

Figure 20:
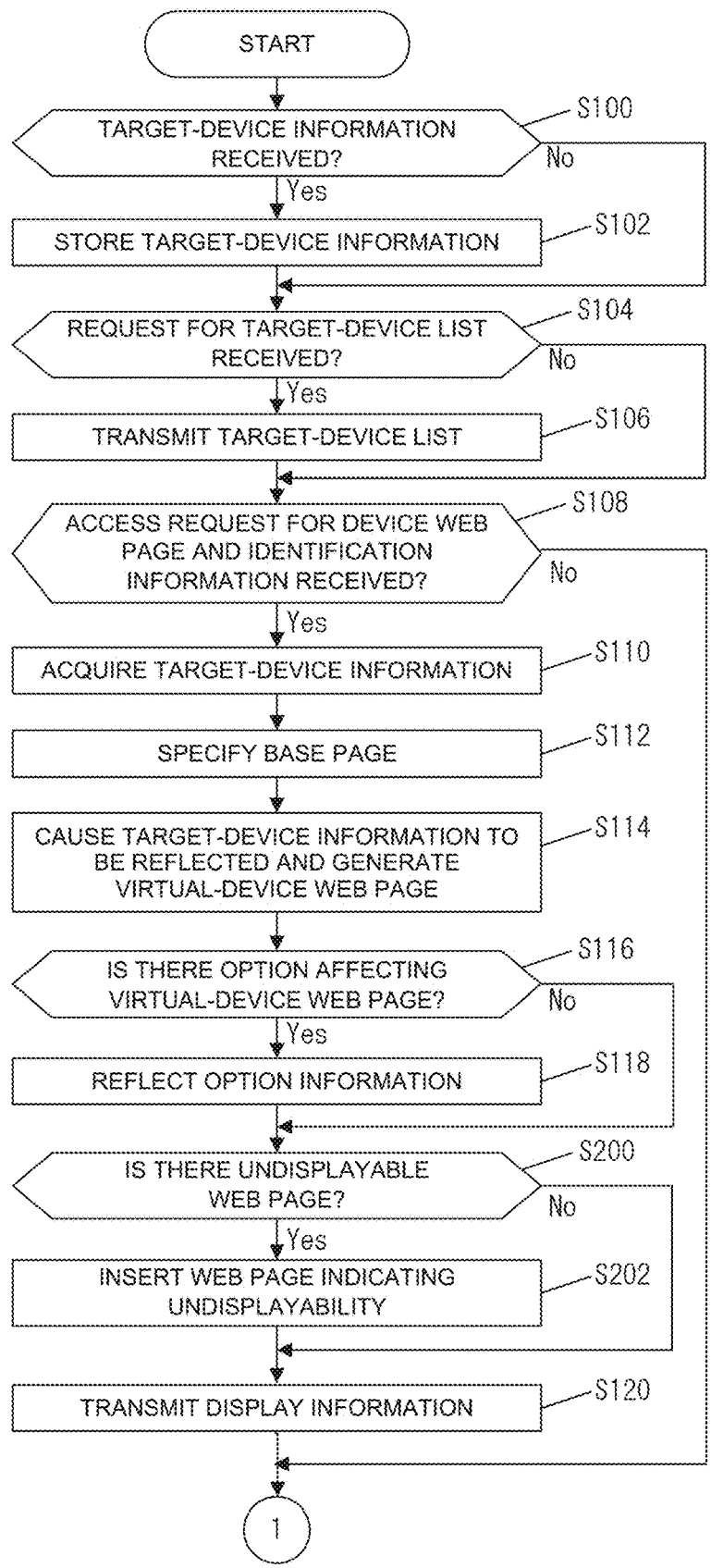
FIG. 20 is a flowchart of main processing of a server device in a Second Embodiment.

With reference to FIG. 20, a flow of main processing executed by the server device 10 of this Embodiment will be explained. In this Embodiment, the virtual-device Web-page generator 104 determines whether or not there is an undisplayable page in the virtual-device Web page (Step S200). The undisplayable page in the virtual-device Web page is a page displaying a setting item for which a setting change or information display via the cloud is prohibited.

If the device Web page has a Web page that cannot be displayed via the cloud, the virtual-device Web-page generator 104 inserts a Web page indicating that the Web page is undisplayable (unsettable) instead of the Web page concerned (Step S200; Yes→Step S202). The page indicating "undisplayable" includes, for example, a message indicating that the setting cannot be changed or the setting contents cannot be displayed from an external device via the cloud. As described above, the virtual-device Web-page generator 104 can generate, via the cloud (first network), a virtual-device Web page that makes it visually recognizable, by a message or the like, that a setting change or display of setting contents is prohibited when there is a setting item for which a setting change or display of setting contents is prohibited.

Moreover, by executing Step S120, the virtual-device Web-page generator 104 can transmit, to the terminal device 20 via the cloud (first network), a Web page indicating that display is not allowed (unsettable) as information indicating that setting change or display of setting contents is prohibited. It is to be noted that, by executing Step S140 in FIG. 14, the terminal device 20 can display to the user that the setting change or the display of the setting contents is are prohibited in a visually recognizable manner by displaying a Web page indicating that display is not allowed (unsettable) in the display information.

On the other hand, if there is no undisplayable page, the virtual-device Web-page generator 104 omits the processing at Step S202 (Step S200; No).

Figure 21:
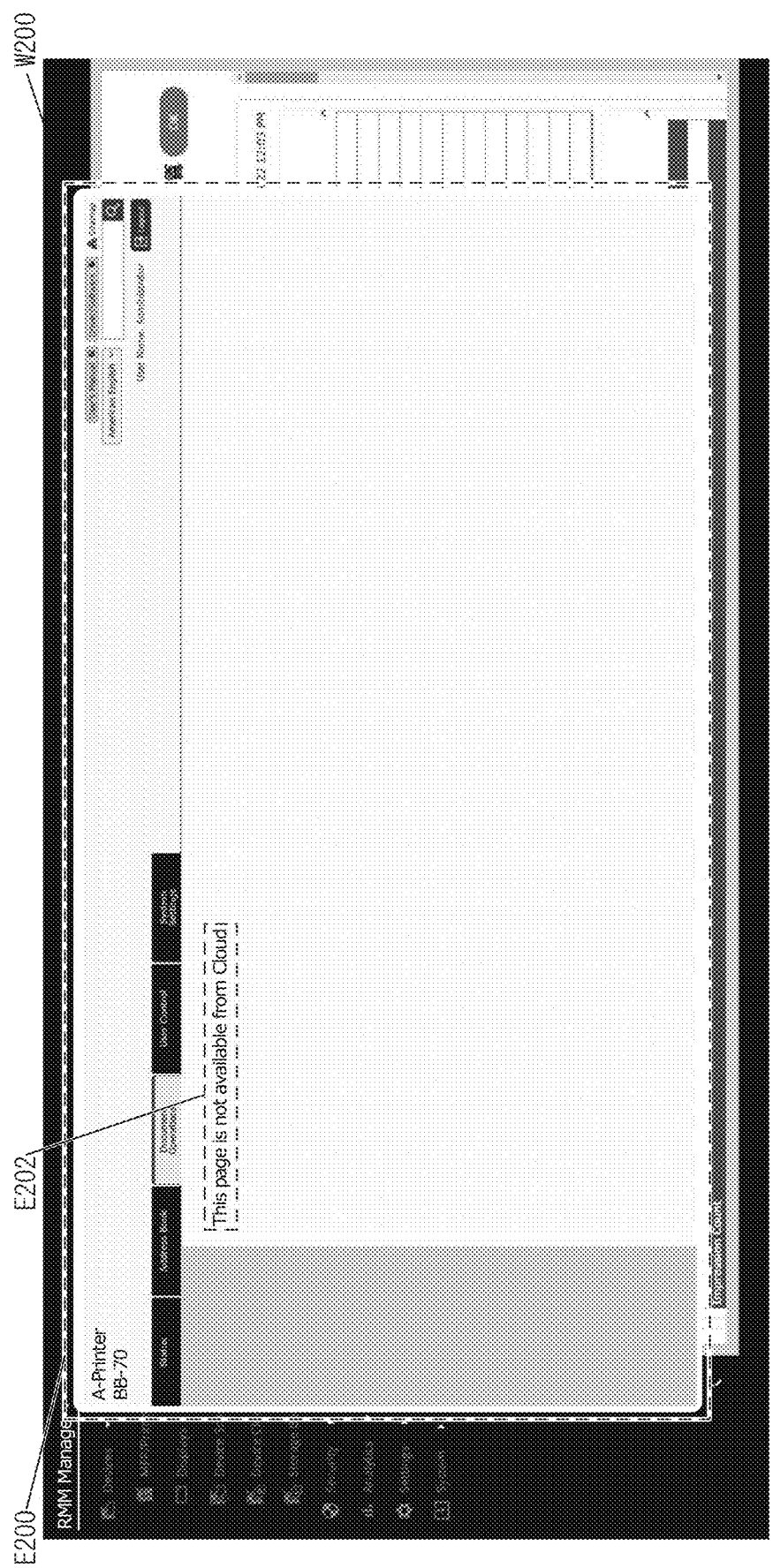
FIG. 21 is a diagram illustrating an operation example in the Second Embodiment.

FIG. 21 is a diagram illustrating a screen example of the screen W200 on which the virtual-device Web page is displayed. FIG. 21 includes an area E200 for displaying a virtual-device Web page. Here, in the area E200, an undisplayable Web page among the virtual-device Web pages is displayed. In this case, a message E202 indicating that the setting cannot be changed from the external device is displayed on the displayed Web page. By checking the message E202, the user can know that the setting cannot be changed or the setting contents cannot be displayed.

It is to be noted that, in the aforementioned method, the case where the message indicating that the setting change or the display of the setting contents via the cloud is prohibited is embedded in the virtual-device Web page was explained, but the message may be displayed as a pop-up display. For example, when an operation to display a page in which a setting change or display of setting contents via the cloud is prohibited is performed, a pop-up display indicating that the page cannot be displayed may be displayed. In other words, the prohibition of the setting change or the display of the setting contents via the cloud may be displayed to the user in a visually recognizable manner.

Moreover, in the aforementioned method, the case where the Web page indicating that the setting value cannot be displayed (cannot be set) is inserted has been described, but in a case where the setting value of some of the setting items in the Web page cannot be changed, it may be displayed in a visually recognizable manner that the setting value cannot be changed only for the setting item concerned. For example, if there is an item for which the setting value cannot be changed, the virtual-device Web-page generator 104 includes information indicating that the change is prohibited in the display information at Step S202.

Specifically, regarding an item whose setting value cannot be changed, the virtual-device Web-page generator 104 includes information (text, for example) for causing contents indicating that the change of the setting value is prohibited to be displayed in the state display information. In this case, the terminal device 20, which received the display information, can display prohibition of the change of the setting value in the form of text in a visually recognizable manner on the virtual-device Web page, which is a user interface for setting the setting value for the item for which the change of the setting value is prohibited.

It is to be noted that, as another example, regarding an item whose setting value cannot be changed, the virtual-device Web-page generator 104 adds an attribute of prohibiting a change to a user interface for changing the item value of the item whose setting value cannot be changed. In this case, the terminal device 20, which received the display information, displays the setting value but can display it in a state where the setting value cannot be changed on the virtual-device Web page, which is a user interface for setting the setting value for the item for which the change of the setting value is prohibited.

Moreover, the setting item for which a change of the setting value via the external network (cloud) is prohibited may be different for each user or may be different in accordance with an authority of the user, a group to which the user belongs or the like.

As described above, according to this Embodiment, when the target device has a setting item for which a setting change or display of setting contents via the cloud is prohibited, it becomes possible not to display the setting item in the terminal device connected to the external network.

3. Third Embodiment

The Third Embodiment is an Embodiment in which the server device 10 and the terminal device 20 in the First Embodiment are integrally configured. In the following explanation, a device in which the server device 10 and the terminal device 20 are integrally configured is explained as a server device 12 in which a display (display device) is provided in the server device 10.

The server device 12 executes processing other than the processing related to the communication between the server device 10 and the terminal device 20 among the processing explained in FIGS. 12 to 14 of the First Embodiment. That is, when an operation of displaying a screen for managing the target device 40 is performed, the server device 12 displays the target device list, and when an operation of displaying the virtual-device Web page is performed, the server device 12 generates and displays the virtual-device Web page. Moreover, when an operation is input from the user, the server device 12 transmits operation-content information to the processing device 30, and when response information is received from the processing device 30, the server device 12 notifies the user of the response information.

As described above, according to this Embodiment, since the processing of communication between the server device and the terminal device can be omitted, performance can be improved.

4. Variation

The present disclosure is not limited to each of the aforementioned Embodiments, and various changes can be made. That is, Embodiments obtained by combining technical means changed as appropriate within a range not departing from the gist of the present disclosure are also included in the technical scope of the present disclosure.

Moreover, the aforementioned Embodiments have parts that are explained separately for convenience of the description, but it is needless to say that the Embodiments may be combined and implemented within the technically possible range. For example, the Second Embodiment and the Third Embodiment may be combined. In this case, the virtual-device Web page is displayed by a device in which the server device 10 and the terminal device 20 are integrally configured, and if there is an undisplayable page in the virtual-device Web page, the undisplayable page is inserted.

Moreover, a program that operates in each device in the Embodiments is a program that controls a CPU or the like (program that causes a computer to function) so as to realize the functions of the aforementioned Embodiments. Then, the information handled by these devices is temporarily stored in a temporary storage device (RAM, for example) at the time of processing, and after that, stored in various storage devices such as a ROM, an HDD and the like, and is read, corrected/written by the CPU as necessary.

Here, as the recording medium for storing the program, a semiconductor medium (a ROM, a non-volatile memory card and the like, for example), an optical recording medium/magneto-optical recording medium (for example, a Digital Versatile Disc (DVD), a Magneto Optical Disc (MO), a Mini Disc (MD), a Compact Disc (CD), a Blu-ray (registered trademark) Disc (BD) and the like), a magnetic recording medium (magnetic tape, a flexible disc and the like, for example) or the like may be used. Moreover, not only that the functions of the aforementioned Embodiments are realized by executing a loaded program, but also the functions of the present disclosure are realized by processing in collaboration with the operating system or another application program or the like on the basis of instructions of the program in some cases.

Moreover, in the case of distribution in the market, the program can be stored and distributed in a portable recording medium or transferred to a server computer connected via a network such as the Internet. In this case, it goes without saying that the storage device of the server computer is also included in the present disclosure.

Moreover, each functional block or various features of the devices used in the aforementioned Embodiments may be implemented or executed by an electric circuit, that is, an integrated circuit or a plurality of integrated circuits, for example. An electric circuit designed to perform the functions described in this Description may comprise a general purpose processor, a digital signal processor (DSP), an application specific integrated circuit (ASIC), a field programmable gate array (FPGA) or other programmable logic devices, a discrete gate or transistor logic, discrete hardware components, or any combination thereof. The general-purpose processor may be a microprocessor or may be any conventional processor, controller, microcontroller, or state machine. The aforementioned electric circuit may be constituted by a digital circuit or an analog circuit. Moreover, when a technology for more integrated circuits which could replace the current integrated circuit emerges as the result of progress of semiconductor technology, it is possible to use a new integrated circuit based on such technology for one or more modes of this disclosure. For example, in the case of the controller 100 in this disclosure, some or all of the processors included in the controller 100 may be constituted by electric circuits. Similarly, some or all of the processors included in the controller 200, the controller 300, the controller 400 may be configured by an electronic circuit.

What is claimed is:

1. A management system comprising:
   a server device connected to a first network;
   a plurality of devices connected to a second network; and
   a terminal device connected to the first network or the second network, wherein
   an agent is executed in a first device of the plurality of devices,
   the agent acquires device information related to a second device of the plurality of devices connected to the second network and transmits the device information to the server device,
   the server device generates display information based on the received device information and transmits the display information to the terminal device,
   the terminal device displays a user interface related to the second device based on the received display information,
   the device information includes setting information related to items settable in the second device and state information indicating a state of the second device,
   the server device generates the display information to include (i) setting display information for displaying the user interface that is capable of setting the items based on the setting information, and (ii) state display information for displaying the state of the second device based on the state information,
   the terminal device displays the user interface for setting the items and for displaying the state information,
   when a change, by the second device, of a setting value of an item via the second network is prohibited, the server device generates the display information to include information indicating that the change is prohibited, and
   when the information indicating that the change is prohibited is included in the display information, the terminal device displays the user interface in a state that the setting value of the item is not changeable.

2. The management system according to claim 1, wherein the device information further includes identification information of the second device and option information related to an option of the second device, and
   the user interface is displayed based on the identification information and the option information of the second device.

3. The management system according to claim 1, wherein the terminal device virtually displays the user interface displayed on the second device based on the device information.

4. The management system according to claim 1, wherein the server device sets an item, among the items, that is not settable in the user interface of the terminal device based on the setting information and the state display information.

5. The management system according to claim 1, wherein the terminal device transmits the setting value of the item, set via the user interface, to the server device,
   the server device transmits the setting value of the item received from the terminal device to the agent, and
   the agent reflects the setting value of the item.

6. The management system according to claim 1, wherein when the information indicating that the change is prohibited is included in the display information, the terminal device displays that the change is prohibited in a visually recognizable manner.

7. The management system according to claim 1, wherein the terminal device transmits information for specifying the second device to the server device, and
   the server device requests the agent to transmit the device information of the second device based on the basis of the information for specifying the second device.

8. The management system according to claim 1, wherein the terminal device displays a Web page as the user interface.

9. The management system according to claim 1, wherein the first network and the second network are separated by a gateway device.

10. The management system according to claim 9, wherein
    the gateway device is a firewall.

11. A management method of a system including a server device connected to a first network, a plurality of devices connected to a second network, and a terminal device connected to the first network or the second network, the management method comprising:
    acquiring, by a first device of the plurality of devices connected to the second network, device information related to a second device of the plurality of devices in the second network;
    transmitting, by the first device, the device information to the server device;
    generating, by the server device, display information based on the received device information; and transmitting, by the server device, the display information for displaying a user interface related to the second device to the terminal device based on the device information, wherein the device information includes setting information related to items settable in the second device and state information indicating a state of the second device, the display information includes (i) setting display information for displaying the user interface that is capable of setting the items based on the setting information, and (ii) state display information for displaying the state of the second device based on the state information, the user interface is for setting the items and for displaying the state information, and the management method further comprises:
- when a change, by the second device, of a setting value of an item via the second network is prohibited, generating, by the server device, the display information to include information indicating that the change is prohibited; and
- when the information indicating that the change is prohibited is included in the display information, displaying, by the terminal device, the user interface in a state that the setting value is not changeable.

12. A server device, that is connected to a first network, included in a management system including:
- a plurality of devices connected to a second network; and
- a terminal device connected to the first network or the second network, wherein an agent is executed in a first device of the plurality of devices, the server device comprising:
- a communicator and a controller, wherein the controller is configured to:
- receive device information related to a second device of the plurality of devices connected to the second network from the agent via the communicator, wherein the device information includes setting information related to items settable in the second device and state information indicating a state of the second device,
- generate, based on the received device information, display information including (i) setting display information for displaying a user interface that is capable of setting the items based on the setting information, and (ii) state display information for displaying the state of the second device based on the state information,
- when a change, by the second device, a setting value of an item via the second network is prohibited, generate the display information to include information indicating that the change is prohibited, and
- transmit the display information for displaying the user interface related to the second device on the terminal device based on the device information received via the communicator.

13. The management system according to claim 1, wherein the item for which changing the setting value via the second network is prohibited is:
- a setting item for which the second device does not comprise an interface for a setting change or a display of setting contents via the second network, or
- a setting item for which the setting change or the display of the setting contents via the second network is restricted for security reasons.

14. The management system according to claim 13, wherein the server device acquires, in advance, via the agent, and stores the setting item, for which the setting change or the display of the setting contents is prohibited, for each model or series of the second device.

* * * * *